US012792544B2

(12) United States Patent
Chen et al.

(10) Patent No.: US 12,792,544 B2
(45) Date of Patent: Nov. 10, 2026

(54) METHOD AND APPARATUS FOR GENERATING HARDWARE INTERFACE SIGNAL, AND ELECTRONIC DEVICE

(71) Applicant: SUZHOU METABRAIN INTELLIGENT TECHNOLOGY CO., LTD., Suzhou (CN)

(72) Inventors: Chaofan Chen, Suzhou (CN); Jiaming Huang, Suzhou (CN); Baoyang Liu, Suzhou (CN)

(73) Assignee: SUZHOU METABRAIN INTELLIGENT TECHNOLOGY CO., LTD., Suzhou (CN)

( * ) Notice: Subject to any disclaimer, the term of this patent is extended or adjusted under 35 U.S.C. 154(b) by 0 days.

(21) Appl. No.: 18/565,397

(22) PCT Filed: Apr. 28, 2023

(86) PCT No.: PCT/CN2023/091854
§ 371 (c)(1),
(2) Date: Nov. 29, 2023

(87) PCT Pub. No.: WO2024/221463
PCT Pub. Date: Oct. 31, 2024

(65) Prior Publication Data
US 2026/0037466 A1 Feb. 5, 2026

(51) Int. Cl.
*G06F 9/38* (2018.01)
*G06F 7/505* (2006.01)
(Continued)

(52) U.S. Cl.
CPC .......... *G06F 13/387* (2013.01); *G06F 7/5055* (2013.01); *G06F 13/10* (2013.01)

(58) Field of Classification Search
None
See application file for complete search history.

(56) References Cited

U.S. PATENT DOCUMENTS 6,249,825 B1 * 6/2001 Sartore .................. G06F 13/10 710/10
7,581,040 B2 * 8/2009 Irisawa ................ G06F 13/387 710/33
(Continued)

FOREIGN PATENT DOCUMENTS

CN 101303683 A 11/2008
CN 102546843 A 7/2012
(Continued)

OTHER PUBLICATIONS

"NCT7491", Jun. 2016, Semiconductor Components Industry (Year: 2016).*

(Continued)

*Primary Examiner* — Hyun Nam
(74) *Attorney, Agent, or Firm* — Merchant & Gould P.C.; Daniel J. Pereira

(57) ABSTRACT

The present disclosure provides a method and apparatus for generating a hardware interface signal, and an electronic device. The method comprises: acquiring, by a first system, a request command; determining multiple pieces of logical bit information corresponding to the request command; and generating a hardware interface signal corresponding to the request command based on the multiple pieces of logical bit information and a timer. The present disclosure solves the technical problem in the related art that the design cost of a chip is relatively high due to the fact that the chip itself needs to have a hardware logic design of a controller.

18 Claims, 12 Drawing Sheets

(51) Int. Cl.

| | |
|---|---|
| ***G06F 9/30*** | (2018.01) |
| ***G06F 13/10*** | (2006.01) |
| ***G06F 13/38*** | (2006.01) |

(56) References Cited

U.S. PATENT DOCUMENTS

| | | | | |
|---|---|---|---|---|
| 7,941,687 | B2 | 5/2011 | Rogers | |
| 8,271,700 | B1 | 9/2012 | Annem | |
| 9,514,065 | B2 * | 12/2016 | Ben-Harosh | G06F 13/387 |
| 10,997,096 | B2 * | 5/2021 | Morris | G06F 13/1684 |
| 12,579,212 | B1 * | 3/2026 | Nandihalli | G06F 16/9574 |
| 2009/0134970 | A1 * | 5/2009 | Iwagami | F02D 41/26 340/3.2 |
| 2009/0300239 | A1 * | 12/2009 | Hubo | G06F 13/426 710/63 |
| 2010/0299462 | A1 | 11/2010 | Yen | |
| 2014/0226708 | A1 * | 8/2014 | Yang | H03K 7/08 375/238 |
| 2014/0268229 | A1 * | 9/2014 | Kempka | G06F 13/387 358/1.15 |
| 2015/0363339 | A1 * | 12/2015 | Huang | G06F 21/33 710/33 |
| 2016/0170929 | A1 * | 6/2016 | Pethe | G06F 13/102 710/313 |
| 2016/0217092 | A1 * | 7/2016 | Huang | G06F 13/4282 |
| 2017/0185559 | A1 * | 6/2017 | Hunsaker | G06F 13/4068 |
| 2023/0138408 | A1 * | 5/2023 | Lam | G06F 13/4282 710/107 |
| 2026/0056514 | A1 * | 2/2026 | Mitchell | G05B 9/03 |

FOREIGN PATENT DOCUMENTS

| | | | |
|---|---|---|---|
| CN | 104020704 | A | 9/2014 |
| CN | 109062850 | A | 12/2018 |
| JP | 2001245017 | A | 9/2001 |
| JP | 2003150186 | A | 5/2003 |
| JP | 2007235242 | A | 9/2007 |
| JP | 2008084273 | A | 4/2008 |

OTHER PUBLICATIONS

Japanese Office Action received for JP Application No. 2023577927 on Jul. 8, 2025, 8 pgs.

European Search Report received for EP Application No. 23817292 on Sep. 10, 2024, 8 pgs.

International Search Report received for PCT/CN2023/091854 on Jan. 4, 2024, 3 pgs.

* cited by examiner

METHOD AND APPARATUS FOR GENERATING HARDWARE INTERFACE SIGNAL, AND ELECTRONIC DEVICE

CROSS-REFERENCE TO RELATED APPLICATION

The present application is a National Stage Filing of PCT International Application No. PCT/CN2023/091854 filed on Apr. 28, 2023, which is incorporated herein by reference in its entirety.

TECHNICAL FIELD

The present disclosure relates to the technical field of communications, and in particular, to a method and apparatus for generating a hardware interface signal, and an electronic device.

BACKGROUND

Currently, in the related art, in order to achieve hardware interface signal communication with external components, a chip itself needs to have a hardware logic design of a related controller, wherein the related controller is configured to process the hardware interface signal.

However, the introduction of the related controller will increase the design cost and manufacturing cost of the chip, and therefore in order to reduce the design difficulty of the chip while reducing the manufacturing cost of the chip, it is urgent to find a new solution.

SUMMARY

Some embodiments of the present disclosure provide a method and apparatus for generating a hardware interface signal, and an electronic device.

At least some embodiments of the present disclosure, provided is a method for generating a hardware interface signal, includes: acquiring, by a first system, a request command; determining multiple pieces of logical bit information corresponding to the request command; and generating the hardware interface signal corresponding to the request command based on the multiple pieces of logical bit information and a timer.

In some embodiments of the present disclosure, the method for generating the hardware interface signal further includes: determining a reload value and an initial matching value which correspond to the timer based on the multiple pieces of logical bit information; and generating the hardware interface signal corresponding to the request command based on the reload value and the initial matching value.

In some embodiments of the present disclosure, the method for generating the hardware interface signal further includes: acquiring a runtime corresponding to each piece of logical bit information of the multiple pieces of logical bit information; determining the reload value based on the runtime; and determining one initial matching value corresponding to the timer based on a logical bit of the each piece of logical bit information, to obtain multiple initial matching values corresponding to the timer, wherein the initial matching value corresponding to the each piece of logical bit information is configured to control the duration when the logical bit information is at a high level, to control a logical bit of the logical bit information to be 0 or 1.

In some embodiments of the present disclosure, the method for generating a hardware interface signal further includes: based on a sequence of the multiple pieces of logical bit information corresponding to the request command, the reload value and the initial matching value which corresponds to the each piece of logical bit information, sequentially generating a hardware interface sub-signal corresponding to the each piece of logical bit information, to obtain the hardware interface signal.

In some embodiments of the present disclosure, the method for generating a hardware interface signal further includes: performing a decrement operation on the reload value corresponding to the each piece of logical bit information based on the timer; before the reload value corresponding to the each piece of logical bit information is decremented to the initial matching value corresponding to the logical bit information, outputting, by the first system, a first signal corresponding to the logical bit information, wherein the first signal is a high-level signal; after the reload value corresponding to the each piece of logical bit information is decremented to the initial matching value corresponding to the logical bit information, outputting, by the first system, a second signal corresponding to the logical bit information, wherein the second signal is a low-level signal; and in response to the reload value corresponding to the each piece of logical bit information being decremented to 0, determining to generate the hardware interface sub-signal corresponding to the logical bit information, to obtain a hardware interface sub-signal corresponding to the each piece of logical bit information, wherein the hardware interface sub-signal corresponding to the each piece of logical bit information is formed by the first signal and the second signal which correspond to the logical bit information.

In some embodiments of the present disclosure, the method for generating a hardware interface signal further includes: in response to the reload value corresponding to the each piece of logical bit information being decremented to the initial matching value corresponding to the logical bit information, triggering a first interrupt corresponding to the logical bit information; and in response to the reload value corresponding to the each piece of logical bit information is decremented to 0, triggering a second interrupt corresponding to the logical bit information.

In some embodiments of the present disclosure, the method for generating a hardware interface signal further includes: in a process of sequentially generating the hardware interface sub-signal corresponding to the each piece of logical bit information based on the reload value and the initial matching value which corresponds to the each piece of logical bit information, performing interrupt count once every time one first interrupt or second interrupt is triggered; and determining a field which is currently performing signal conversion processing in the request command based on the interrupt count, wherein the signal conversion processing is configured to generate the hardware interface sub-signal corresponding to logical bit information which corresponds to each field in the request command.

In some embodiments of the present disclosure, the method for generating the hardware interface signal further includes: acquiring the number of bytes corresponding to each field in the request command; determining the number of pieces of logical bit information corresponding to the request command based on the number of bytes, wherein each byte corresponding to the request command corresponds to one piece of logical bit information; determining the number of interrupts corresponding to the request command based on the number of pieces of logical bit information, wherein the number of interrupts corresponding to the request command is twice the number of pieces of logical bit information; and determining the field which is currently performing signal conversion processing in the request command based on the number of interrupts and the interrupt count.

In some embodiments of the present disclosure, the method for generating the hardware interface signal further includes: determining logical bit information which is currently converted into the hardware interface sub-signal based on the number of interrupts and the interrupt count; determining a byte corresponding to the logical bit information which is currently converted into the hardware interface sub-signal as a target byte; and determining that a field corresponding to the target byte is the field which is currently performing signal conversion processing in the request command.

In some embodiments of the present disclosure, a data structure of request data corresponding to the request command is a first data structure, wherein the first data structure at least includes a device address, a write length, a read length, a command code and a request parameter; the device address is configured to characterize an address of a target device, the target device is a device generating response data based on the hardware interface signal, the command code is configured to distinguish different request commands, the write length is configured to characterize the number of bytes from the start of the command code to the end of the request data, the read length is configured to characterize the number of bytes containing a completion code and read data in the request data, and the request parameter is configured to characterize a parameter of the request command.

In some embodiments of the present disclosure, the method for generating the hardware interface signal further includes: in response to the first system detects a first request triggered by the second system, acquiring the request data, wherein the first system and the second system run on the same processor, the request data is generated by the second system, and a service response speed of the second system is less than a service response speed of the first system; and parsing the request data, to obtain the request command.

In some embodiments of the present disclosure, the method for generating a hardware interface signal further includes: before the request data is acquired, storing, by the second system, the request data in a target memory, and after the request data is completely stored, triggering, by the second system, the first request, wherein the first request is configured to notify the first system of reading the request data from the target memory, and the target memory is a memory that can be accessed by both the first system and the second system.

In some embodiments of the present disclosure, the method for generating the hardware interface signal further includes: after the hardware interface signal corresponding to the request command is generated based on the logical bit information and the timer, converting a voltage of the hardware interface signal, to obtain a target hardware interface signal.

In some embodiments of the present disclosure, the method for generating a hardware interface signal further includes: inputting the hardware interface signal into a voltage conversion device, to obtain the target hardware interface signal outputted by the voltage conversion device.

In some embodiments of the present disclosure, the method for generating a hardware interface signal further includes: after the hardware interface signal corresponding to the request command is generated based on the logical bit information and the timer, receiving, by the first system, response data corresponding to the hardware interface signal, wherein a transmission form of the response data is the same as a transmission form of the hardware interface signal; and adjusting the data structure of the response data to a second data structure.

In some embodiments of the present disclosure, the second data structure at least includes: a first check value, a second check value and response validity data, wherein the first check value is configured to characterize a check value in the request data, the second check value is configured to characterize a check value in the response data, the response validity data is configured to characterize a completion code in the response data and data for describing a state of the target device, and the target device is a device generating the response data according to the hardware interface signal.

In some embodiments of the present disclosure, the method for generating a hardware interface signal further includes: after the data structure of the response data is adjusted to the second data structure, triggering, by the first system, a second request, wherein the second request is configured to notify the second system of reading the response data.

In some embodiments of the present disclosure, the hardware interface signal is any one signal of a Platform Environment Control Interface (PECI) signal, an High Definition Multimedia Interface (HDMI) signal, an Serial Gigabit Media Independent Interface (SGMII) signal, an Reduced Gigabit Media Independent Interface (RGMII) signal, a General-purpose input/output (GPIO) signal, and an Serial Peripheral Interface (SPI) signal.

At least some embodiments of the present disclosure, an apparatus for generating a hardware interface signal is further provided, includes: an acquisition module, configured to acquire, by a first system, a request command; a determination module, configured to determine multiple pieces of logical bit information corresponding to the request command; and a generation module, configured to generate the hardware interface signal corresponding to the request command based on the multiple pieces of logical bit information and a timer.

In some embodiments of the present disclosure, the generation module includes: a first determination unit and a second generation unit. The first determination unit is configured to determine a reload value and an initial matching value correspond to the timer based on the multiple pieces of logical bit information; and the second generation unit is configured to generate the hardware interface signal corresponding to the request command based on the reload value and the initial matching value.

In some embodiments of the present disclosure, the first determination unit further includes: a first acquisition sub-unit, a first determination sub-unit and a second determination sub-unit. The first acquisition sub-unit is configured to acquire a runtime corresponding to each piece of logical bit information of the multiple pieces of logical bit information; the first determination sub-unit is configured to determine the reload value based on the runtime; and the second determination sub-unit is configured to determine one initial matching value corresponding to the timer based on a logical bit of the each piece of logical bit information, to obtain multiple initial matching values corresponding to the timer, wherein the initial matching value corresponding to the each piece of logical bit information is configured to control the duration when the logical bit information is at a high level, to control a logical bit of the logical bit information to be 0 or 1.

In some embodiments of the present disclosure, the second generation unit further includes: a first generation sub-unit is configured to sequentially generate a hardware interface sub-signal corresponding to each piece of logical bit information based on a sequence of the multiple pieces of logical bit information corresponding to the request command, the reload value and the initial matching value which corresponds to the each piece of logical bit information, to obtain the hardware interface signal.

In some embodiments of the present disclosure, the first generation sub-unit further includes: a decrement sub-module, a first signal output sub-module, a second signal output sub-module and a first determination sub-module. The decrement sub-module is configured to perform a decrement operation on the reload value corresponding to the each piece of logical bit information based on the timer; the first signal output sub-module is configured to output, by the first system, a first signal corresponding to the logical bit information, before the reload value corresponding to the each piece of logical bit information is decremented to the initial matching value corresponding to the logical bit information, wherein the first signal is a high-level signal; the second signal output sub-module is configured to output, by the first system, a second signal corresponding to the logical bit information, after the reload value corresponding to each piece of logical bit information is decremented to the initial matching value corresponding to the logical bit information wherein the second signal is a low-level signal; and the first determination sub-module is configured to determine to generate a hardware interface sub-signal corresponding to the logical bit information, to obtain the hardware interface sub-signal corresponding to the each piece of logical bit information, in response to the reload value corresponding to the each piece of logical bit information being decremented to 0, wherein the hardware interface sub-signal corresponding to the each piece of logical bit information is formed by the first signal and the second signal which correspond to the logical bit information.

In some embodiments of the present disclosure, the apparatus for generating the hardware interface signal further includes: a first interrupt triggering module and a second interrupt triggering module. The first interrupt triggering module is configured to trigger a first interrupt corresponding to the logical bit information in response to the reload value corresponding to the each piece of logical bit information being decremented to the initial matching value corresponding to the logical bit information; and the second interrupt triggering module is configured to trigger a second interrupt corresponding to the logical bit information in response to the reload value corresponding to each piece of logical bit information is decremented to 0.

In some embodiments of the present disclosure, the apparatus for generating the hardware interface signal further includes: an interrupt count module and a field determination module. The interrupt count module is configured to perform interrupt count once every time one first interrupt or second interrupt is triggered; and the field determination module is configured to determine a field which is currently performing signal conversion processing in the request command based on the interrupt count, wherein the signal conversion processing is configured to generate the hardware interface sub-signal corresponding to logical bit information which corresponds to each field in the request command.

In some embodiments of the present disclosure, the field determination module further includes: a second acquisition unit, a second determination unit, a third determination unit, and a fourth determination unit. The second acquisition unit is configured to acquire the number of bytes corresponding to each field in the request command; the second determination unit is configured to determine the number of pieces of logical bit information corresponding to the request command based on the number of bytes, wherein each byte corresponding to the request command corresponds to one piece of logical bit information; the third determination unit is configured to determine the number of interrupts corresponding to the request command based on the number of pieces of logical bit information, wherein the number of interrupts corresponding to the request command is twice the number of pieces of logical bit information; and the fourth determination unit is configured to determine the field which is currently performing signal conversion processing in the request command based on the number of interrupts and the interrupt count.

In some embodiments of the present disclosure, the fourth determination unit further includes: a third determination sub-unit, a fourth determination sub-unit and a fifth determination sub-unit. The third determination sub-unit is configured to determine logical bit information which is currently converted into the hardware interface sub-signal based on the number of interrupts and the interrupt count; the fourth determination sub-unit is configured to determine a byte corresponding to the logical bit information which is currently converted into the hardware interface sub-signal as a target byte; and the fifth determination sub-unit is configured to determine that a field corresponding to the target byte is the field which is currently performing signal conversion processing in the request command.

In some embodiments of the present disclosure, the acquisition module further includes: a request data acquisition unit and a request data parsing unit. The request data acquisition unit is configured to acquire the request data in response to the first system detects a first request triggered by the second system, wherein the first system and the second system run on the same processor, the request data is generated by the second system, and a service response speed of the second system is less than a service response speed of the first system; and the request data parsing unit is configured to parse the request data, to obtain the request command.

In some embodiments of the present disclosure, the apparatus for generating the hardware interface signal further includes: a request data storage module is configured to store, by the second system, the request data in a target memory, and after the request data is stored, trigger, by the second system, the first request, wherein the first request is configured to notify the first system of reading the request data from the target memory, and the target memory is a memory that can be accessed by both the first system and the second system.

In some embodiments of the present disclosure, the apparatus for generating the hardware interface signal includes: a voltage conversion module is configured to convert a voltage of the hardware interface signal, to obtain a target hardware interface signal.

In some embodiments of the present disclosure, the voltage conversion module further includes: a signal input unit is configured to input the hardware interface signal into a voltage conversion device, to obtain the target hardware interface signal outputted by the voltage conversion device.

In some embodiments of the present disclosure, the apparatus for generating the hardware interface signal further includes: a response data receiving module and a data structure adjustment module. The response data receiving module is configured to receive, by the first system, response data corresponding to the hardware interface signal, wherein a transmission form of the response data is the same as a transmission form of the hardware interface signal; and the data structure adjustment module is configured to adjust the data structure of the response data to a second data structure.

In some embodiments of the present disclosure, the apparatus for generating the hardware interface signal further includes: a second request triggering module is configured to trigger, by the first system, a second request, wherein the second request is configured to notify the second system of reading the response data.

At least some embodiments of the present disclosure, further provided is a computer-readable storage medium, the computer-readable storage medium storing a computer program, wherein the computer program is configured to execute, when running, the steps in any one of the method embodiments above.

At least some embodiments of the present disclosure, further provided is an electronic device, comprising a memory and a processor, wherein the memory stores a computer program, and the processor is configured to run the computer program so as to execute the steps in any one of the method embodiments above.

At least some embodiments of the present disclosure, further provided is an embedded system; the embedded system includes: a first system and a processor, wherein the first system runs on the processor; the first system, configured to acquire a request command; determine multiple pieces of logical bit information corresponding to the request command; and generate a hardware interface signal corresponding to the request command based on the multiple pieces of logical bit information and a timer.

In some embodiments of the present disclosure, the first system, configured to determine a reload value and an initial matching value which correspond to the timer based on the multiple pieces of logical bit information; and the first system, configured to generate a hardware interface signal corresponding to the request command based on the reload value and the initial matching value.

In some embodiments of the present disclosure, the first system, configured to acquire a runtime corresponding to each piece of logical bit information of the multiple pieces of logical bit information; the first system, configured to determine the reload value according to the runtime; and the first system is configured to determine one initial matching value corresponding to the timer according to a logical bit of each piece of logical bit information, to obtain multiple initial matching values corresponding to the timer, wherein the initial matching value corresponding to each piece of logical bit information is configured to control the duration when the logical bit information is at a high level, to control a logical bit of the logical bit information to be 0 or 1.

In some embodiments of the present disclosure, the first system, configured to sequentially generate a hardware interface sub-signal corresponding to each piece of logical bit information based on a sequence of the multiple pieces of logical bit information corresponding to the request command, the reload value and the initial matching value which correspond to each piece of logical bit information, so as to obtain the hardware interface signal.

In some embodiments of the present disclosure, the first system, configured to perform a decrement operation on the reload value corresponding to the each piece of logical bit information based on the timer; the first system, configured to output a first signal corresponding to the logical bit information before the reload value corresponding to each piece of logical bit information is decremented to the initial matching value corresponding to the logical bit information, wherein the first signal is a high-level signal; the first system, configured to output a second signal corresponding to the logical bit information after the reload value corresponding to each piece of logical bit information is decremented to the initial matching value corresponding to the logical bit information, wherein the second signal is a low-level signal; and the first system, configured to determine to generate a hardware interface sub-signal corresponding to the logical bit information in response to the reload value corresponding to each piece of logical bit information being decremented to 0, to obtain a hardware interface sub-signal corresponding to the each piece of logical bit information, wherein the hardware interface sub-signal corresponding to the each piece of logical bit information is formed by the first signal and the second signal which correspond to the logical bit information.

In some embodiments of the present disclosure, the first system, configured to trigger a first interrupt corresponding to the logical bit information in response to the reload value corresponding to each piece of logical bit information being decremented to the initial matching value corresponding to the logical bit information; and the first system, configured to trigger a second interrupt corresponding to the logical bit information in response to the reload value corresponding to each piece of logical bit information being decremented to 0.

In some embodiments of the present disclosure, the first system, configured to perform interrupt count once every time one first interrupt or second interrupt is triggered; and the first system, configured to determine a field which is currently performing signal conversion processing in the request command based on the interrupt count, wherein the signal conversion processing is configured to generate the hardware interface sub-signal corresponding to logical bit information which corresponds to each field in the request command.

In some embodiments of the present disclosure, the first system, configured to acquire the number of bytes corresponding to each field in the request command; the first system, configured to determine the number of pieces of logical bit information corresponding to the request command based on the number of bytes, wherein each byte corresponding to the request command corresponds to one piece of logical bit information; the first system, configured to determine the number of interrupts corresponding to the request command according to the number of pieces of logical bit information, wherein the number of interrupts corresponding to the request command is twice the number of pieces of logical bit information; and the first system is configured to determine the field which is currently performing signal conversion processing in the request command according to the number of interrupts and the interrupt count.

In some embodiments of the present disclosure, the first system, configured to determine logical bit information which is currently converted into the hardware interface sub-signal based on the number of interrupts and the interrupt count; the first system, configured to determine a byte corresponding to the logical bit information which is currently converted into the hardware interface sub-signal as a target byte; and the first system, configured to determine that the field corresponding to the target byte is the field which is currently performing signal conversion processing in the request command.

In some embodiments of the present disclosure, the embedded system further includes a second system, wherein the second system and the first system both run on the processor, and the second system, configured to generate request data; the first system, configured to acquire the request data in response to detect a first request triggered by the second system, wherein a service response speed of the second system is less than a service response speed of the first system; and the first system is configured to parse the request data, to obtain the request command.

In some embodiments of the present disclosure, the second system, configured to store the request data in a target memory, and after the request data is stored, trigger the first request, wherein the first request is configured to notify the first system of reading the request data from the target memory, and the target memory is a memory that can be accessed by both the first system and the second system.

In some embodiments of the present disclosure, the first system, configured to convert a voltage of the hardware interface signal, to obtain a target hardware interface signal.

In some embodiments of the present disclosure, the first system, configured to input the hardware interface signal into a voltage conversion device, to obtain the target hardware interface signal outputted by the voltage conversion device.

In some embodiments of the present disclosure, the first system, configured to receive response data corresponding to the hardware interface signal, wherein a transmission form of the response data is the same as a transmission form of the hardware interface signal; and the first system, configured to adjust the data structure of the response data to a second data structure.

In some embodiments of the present disclosure, the first system, configured to trigger a second request, wherein the second request is configured to notify the second system of reading the response data.

At least some embodiments of the present disclosure, a chip is also provided, wherein the chip includes at least one of a programmable logic circuit and executable instructions, and the chip runs in an electronic device and is configured to implement the steps in any one of the method embodiments above.

At least some embodiments of the present disclosure, further provided is a BMC chip, includes: a storage unit and a processing unit connected to the storage unit, wherein the storage unit is configured to store a program, and the processing unit is configured to run the program to execute the steps in any one of the method embodiments above.

At least some embodiments of the present disclosure, further provided is a main board, includes: at least one processor; and at least one memory, for storing at least one program; when the at least one program is executed by the at least one processor, the at least one processor implements the steps in any one of the method embodiments above.

At least some embodiments of the present disclosure, further provided is a server, includes a processor, a communication interface, a memory and a communication bus, wherein the processor, the communication interface and the memory complete communication with each other by the communication bus; the memory is configured to store a computer program; and the processor is configured to implement the steps in any one of the method embodiments above when executing the program stored in the memory.

In some embodiments of the present disclosure, a manner of the first system generating the hardware interface signal corresponding to a request command is used, in which first the request command is acquired by the first system, then multiple pieces of logical bit information corresponding to the request command are determined, and finally, the hardware interface signal corresponding to the request command is generated according to the multiple pieces of logical bit information and a timer. It can be determined from the content above that in some embodiments of the present disclosure, the hardware interface signal corresponding to the request command is generated by a first system, so that the technical effect of simulating by using a software manner to generate the hardware interface signal is achieved, thereby achieving the object that a chip itself does not need to have a hardware logic design of a relevant hardware interface signal, which not only reduces the design difficulty of the chip, but also reduces the design cost of the chip. Some embodiments of the present disclosure achieve the purpose of using a software system to generate the hardware interface signal on the basis that a chip does not need to have a hardware logic design of a hardware interface signal, thereby reducing the design difficulty of the chip, and further solving the technical problem in the related art that the design cost of the chip is relatively high due to the fact that the chip itself needs to have a hardware logic design of a controller.

BRIEF DESCRIPTION OF THE DRAWINGS

Drawings described herein are configured to provide further understanding of some embodiments of the present disclosure and constitute a part of some embodiments of the present disclosure. The exemplary embodiments of the present disclosure and the illustration thereof are used to explain some embodiments of the present disclosure, but do not constitute improper limitations to some embodiments of the present disclosure. In the drawings.

DETAILED DESCRIPTION OF THE EMBODIMENTS

In order to make a person skilled in the art better understand solutions of some embodiments of the present disclosure, the solutions in the embodiments of the present disclosure will be clearly and completely described below in combination with the drawings in the embodiments of the present disclosure. It is apparent that the described embodiments are not all embodiments but part of embodiments of the present disclosure. All other embodiments obtained by a person of ordinary skill in the art on the basis of the embodiments in the present disclosure without any inventive effort shall fall within the scope of protection of some embodiments of the present disclosure.

It should be noted that the terms "first", "second" etc., in the description, claims, and accompanying drawings of some embodiments of the present disclosure are used to distinguish similar objects, and are not necessarily used to describe a sequence or order. It should be understood that the data so used may be interchanged where appropriate, so that the embodiments of the present disclosure described herein can be implemented in sequences other than those illustrated or described herein. In addition, the terms "comprise" and "have" and any variations thereof are intended to cover a non-exclusive inclusion, for example, a process, method, system, product or device that comprises a series of steps or units is not necessarily limited to those steps or units that are clearly listed, but may comprise other steps or units that are not clearly listed or inherent to such process, method, product or device.

It should be noted that user information (included but not limited to, user equipment information, user personal information, etc.) and data (included but not limited to, data for analysis, data for storage, data for display, electronic medical records, etc.) involved in some embodiments of the present disclosure are information and data which are authorized by a user or sufficiently authorized by various parties; and collection, use, and processing of relevant data need to comply with relevant legal regulations and standards of relevant countries and regions, and a corresponding operation entry is provided for the user to select authorization or denying.

According to embodiments of the present disclosure, a method for generating a hardware interface signal is provided. It should be noted that the steps illustrated in the flowchart of the drawings can be executed in a computer system such as a set of computer-executable instructions, and although a logical order is shown in the flowchart, in some cases, the steps shown or described can be executed in a different order from that described herein.

Figure 1:
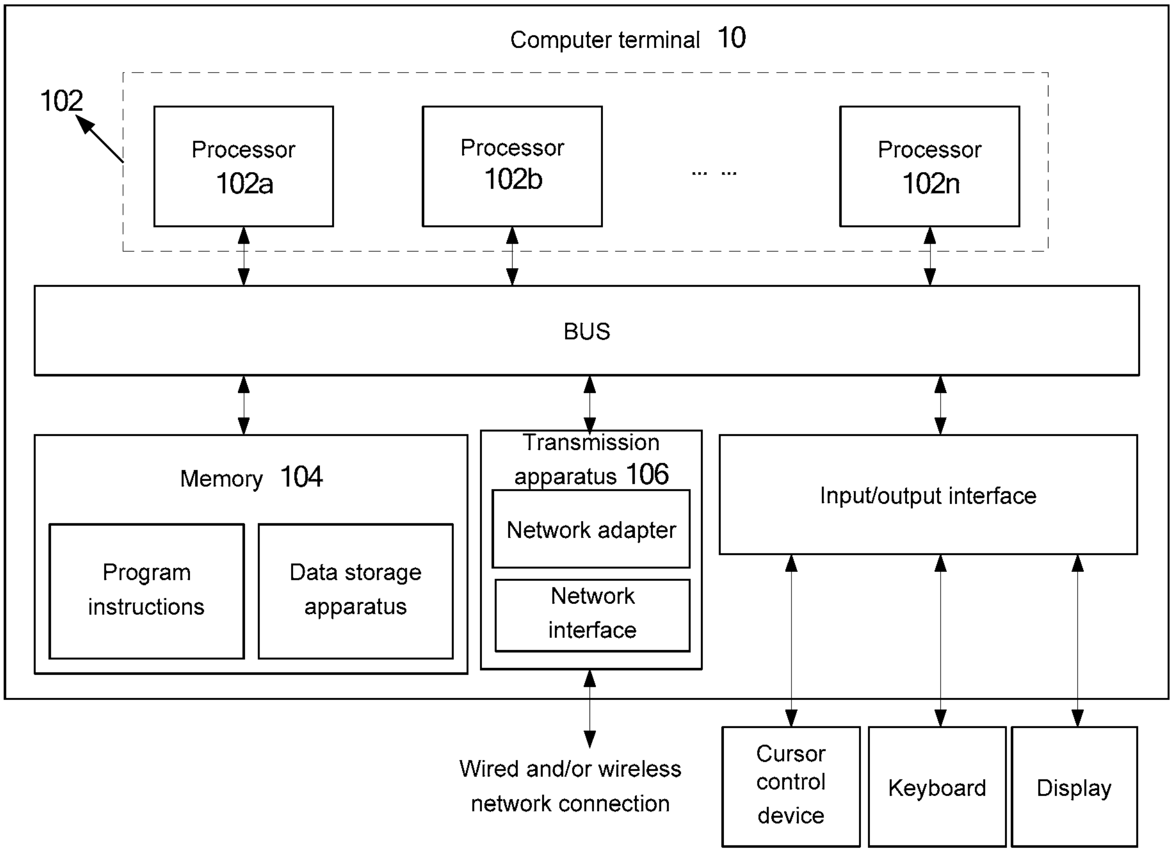
FIG. 1 is a schematic diagram of a computer terminal provided according to embodiments of the present disclosure.

Method embodiments provided in the present disclosure can be executed in a mobile terminal, a computer terminal or a similar computing apparatus. FIG. 1 is a structural block diagram of hardware of the computer terminal (or mobile device) for implementing a method for generating the hardware interface signal. As shown in FIG. 1, the computer terminal (or mobile device) 10 may include: a processor set 102 (the processor set 102 may include but is not limited to, processing apparatuses such as a microprocessor MCU or a programmable logic device FPGA, and the processor set 102 can include a processor set, illustrated by using 102*a*, 102*b*, . . . , 102*n* in FIG. 1); a memory 104 for storing data; and a transmission module 106 for a communication function. In addition, the computer terminal can further include: a display, an input/output interface (I/O interface), a Universal Serial Bus (USB) port (which may be included as one of ports of a bus), a network interface, a power supply, and/or a camera. A person of ordinary skill in the art would understand that the structure shown in FIG. 1 is exemplary, and does not limit the structure of the electronic apparatus above. For example, the computer terminal 10 can also include more or fewer assemblies than those shown in FIG. 1, or have different configurations from that shown in FIG. 1.

It should be noted that the at least one processor 102 described above and/or other data processing circuits can be generally referred to herein as "data processing circuits". The data processing circuits can be embodied wholly or partially in software, hardware, firmware, or any other combinations. In an embodiment, the data processing circuit can be a single, independent processing module, or may be incorporated, in whole or in part, into any of the other elements in the computer terminal 10 (or mobile device).

The memory 104 is configured to store software programs and modules of application software, such as program instructions/data storage apparatus corresponding to the method for generating the hardware interface signal in embodiments of the present disclosure; and the processors 102 run the software programs and modules stored in the memory 104, to execute multiple functional applications and data processing, i.e. implementing the described method for generating the hardware interface signal. The memory 104 can include a high-speed random access memory, and can also include a non-transitory memory, such as one or more magnetic storage apparatuses, flash memories or other non-transitory solid-state memories. In some examples, the memory 104 can further include memories remotely arranged with respect to the processors 102, and these remote memories can be connected to the computer terminal 10 via a network. Examples of the network include but are not limited to the Internet, an intranet, a local area network, a mobile communication network and a combination thereof.

The transmission apparatus 106 is configured to receive or send data via a network. The examples of the network can include a wireless network provided by a communication provider of the computer terminal 10. In one example, the transmission apparatus 106 includes a network adapter (Network Interface Controller, NIC) which may be connected to other network devices by means of a base station, thereby being able to communicate with the Internet. In one example, the transmission apparatus 106 may be a Radio (RF for short) module which is configured to communicate with the Internet in a wireless manner.

The display may be, for example, a touch-screen liquid crystal display (LCD) that can enable a user to interact with a user interface of the computer terminal 10 (or mobile device).

Figure 2:
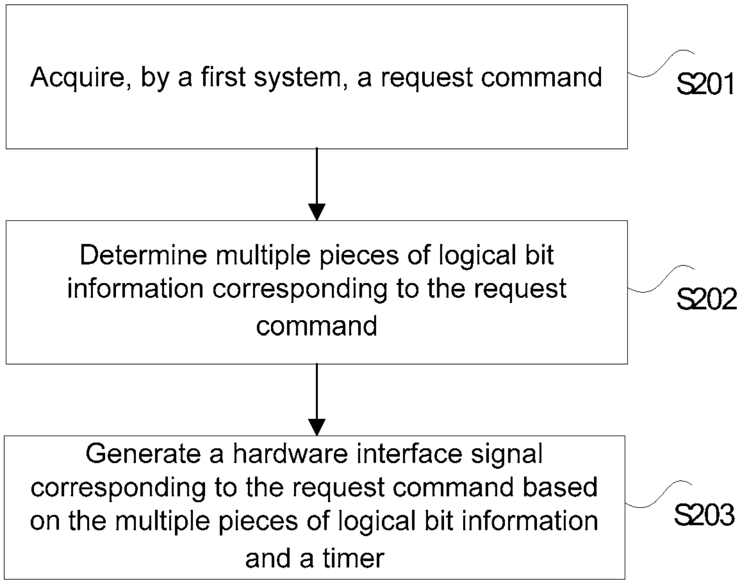
FIG. 2 is a flowchart of a method for generating a hardware interface signal according to embodiments of the present disclosure.

Under the operating environment above, some embodiments of the present disclosure provide a method for generating the hardware interface signal as shown in FIG. 2. As shown in FIG. 2, the method includes the following steps:

at step S201: acquiring, by a first system, a request command.

In the step S201, the first system may be a software system deployed on a chip, for example, an Real-time System (RTOS) system; and the request command may be a command for generating the hardware interface signal, for example, the hardware interface signal may be a platform environment control interface (PECI) signal, then the request command is a PECI protocol-based PECI request command.

In addition, the chip may be a Baseboard Management Controller (BMC, a server platform management controller chip, which may achieve functions such as health state monitoring of a server, remote power on/off, temperature (voltage) collection, and fault diagnosis) chip and can also be other types of chips; the types of the chip are not limited in some embodiments of the present disclosure.

Optionally, the hardware interface signal can also be a hardware interface signal of other protocol types, for example, an High Definition Multimedia Interface (HDMI) signal, an Reduced Gigabit Media Independent Interface (RGMII, a parallel bus) signal, an Serial Gigabit Media Independent Interface (SGMII, a single-path transmission serial bus) signal, a General-Purpose Input/Output (GPIO, a general-purpose input/output port) signal, and an Serial Peripheral Interface (SPI) signal, etc. On this basis, the request command may also be a request command of other protocol types, for example, when the hardware interface signal is a GPIO signal, the request command is a GPIO request command. The types of the request command and the hardware interface signal are not limited in some embodiments of the present disclosure.

In addition, it should also be noted that in addition to being an RTOS system, the first system may also be another software system, for example, a Linux system or another self-developed software system. In some embodiments of the present disclosure, it is only necessary that the first system can ensure that the hardware interface signal is generated and outputted continuously.

At step S202: determining multiple pieces of logical bit information corresponding to the request command.

In the step S202, after the request command is obtained, the first system can analyze the request command to obtain the multiple pieces of logical bit information corresponding to the request command, wherein the multiple pieces of logical bit information have a sequence, the first system can generate a waveform signal (i.e. the hardware interface signal) corresponding to the request command by the multiple pieces of logical bit information corresponding to the request command, to transmit information contained in the request command to other devices by the hardware interface signal.

Optionally, the request command includes at least one field, and each field can be represented by a logical bit 0 or 1. On this basis, a corresponding conversion relationship between each field and the logical bit 1 or 0 is logical bit information corresponding to the field; and in cases where the request command corresponds to a plurality of fields, the request command corresponds to multiple pieces of logical bit information. In addition, each logical bit can be represented by combined use of a high-level signal and a low-level signal; for example, for logical bit 0, a high-level signal of a first preset duration and a low-level signal of a second preset duration can be used for combined representation; and for logical bit 1, a high-level signal of the second preset duration and a low-level signal of the first preset duration can be used for combined representation, in which the first preset duration and the second preset duration are different. On this basis, since each logical bit contains both a high-level signal and a low-level signal, each logical bit is actually represented by a segment of waveform signal (transformation between high-level and low-level signals presents as a waveform). Since the request command corresponds to multiple pieces of logical bit information, that is, corresponds to multiple logical bits, the hardware interface signal corresponding to the request command is one waveform signal obtained by combining waveform signals corresponding to each piece of logical bit information.

At step S203, generating a hardware interface signal corresponding to the request command based on the multiple pieces of logical bit information and a timer.

Optionally, the timer in the step S203 can be a timing program in the first system, and the timer can also be a register on a chip where the first system is located, wherein the timer can at least provide a timing function and a counting function. In some embodiments of the present disclosure, the timing function and the counting function of the timer are used in combination with the multiple pieces of logical bit information, to generate the hardware interface signal corresponding to the request command.

It should be noted that taking the chip being the BMC chip and the hardware interface signal being the PECI signal as an example, in the related art, in order to achieve PECI communication between the BMC chip and components such as a CPU (central processing unit), the BMC chip itself needs to have a hardware logic design of a PECI controller, thereby causing the problem of a high design cost of the BMC chip. In other words, in the related art, in order to generate the PECI signal on the BMC chip, the hardware logic design of the PECI controller must be implemented on the BMC chip in advance; however, in some embodiments of the present disclosure, the PECI signal can be generated on the BMC chip only by using the first system, and it is not necessary to implement the hardware logic design of the PECI controller on the BMC chip, thereby reducing the design difficulty and design cost of the BMC chip.

On the basis of the content of the step S201 to the step S203, it can be determined that in some embodiments of the present disclosure, the manner of the first system generating the hardware interface signal corresponding to the request command is used, in which first the request command is acquired by the first system, then multiple pieces of logical bit information corresponding to the request command are determined, and finally, the hardware interface signal corresponding to the request command is generated based on the multiple pieces of logical bit information and the timer.

It can be determined from the content above that in some embodiments of the present disclosure, the hardware interface signal corresponding to the request command is generated by the first system, so that the technical effect of simulating by using a software manner to generate the hardware interface signal is achieved, thereby achieving the object that a chip itself does not need to have a hardware logic design of a relevant hardware interface signal, which not only reduces the design difficulty of the chip, but also reduces the design cost of the chip.

Hence, some embodiments of the present disclosure achieve the purpose of using the software system to generate the hardware interface signal on the basis that a chip does not need to have the hardware logic design of the hardware interface signal, thereby reducing the design difficulty of the chip, and further solving the technical problem in the related art that the design cost of the chip is relatively high due to the fact that the chip itself needs to have a hardware logic design of a controller.

In optional embodiments, in order to generate the hardware interface signal corresponding to the request command based on the multiple pieces of logical bit information and the timer, the first system first determines a reload value and an initial matching value which correspond to the timer based on the multiple pieces of logical bit information, and then generates the hardware interface signal corresponding to the request command based on the reload value and the initial matching value.

Optionally, the reload value can be understood as a counting period of the timer, for example, when the reload value is assumed to be 100 ms, the timer restarts counting after counting for every 100 ms. The initial matching value is configured to control a logical bit corresponding to each piece of logical bit information to be 0 or 1.

Optionally, in the process of determining the reload value and the initial matching value which correspond to the timer based on the multiple pieces of logical bit information, the first system first acquires a runtime corresponding to each piece of logical bit information of the multiple pieces of logical bit information, and then determines the reload value according to the runtime. Moreover, the first system will also determine one initial matching value corresponding to the timer according to a logical bit of each piece of logical bit information, to obtain multiple initial matching values corresponding to the timer, wherein the initial matching value corresponding to each piece of logical bit information is configured to control the duration when the logical bit information is at a high level, to control a logical bit of the logical bit information to be 0 or 1.

It should be noted that generally, in one signal transmission protocol, each piece of logical bit information in the multiple pieces of logical bit information corresponds to the same runtime. For example, assuming that the runtime corresponding to each piece of logical bit information is bit time (tBIT), then the reload value corresponding to the timer is a numerical value obtained by performing conversion on the tBIT based on a timing unit of the timer. For example, when the runtime tBIT is 100 seconds, the timing unit of the timer is second, and then the reload value is 100.

In addition, the initial matching value corresponding to the each piece of logical bit information is related to the logical bit corresponding to the logical bit information.

Figure 3:
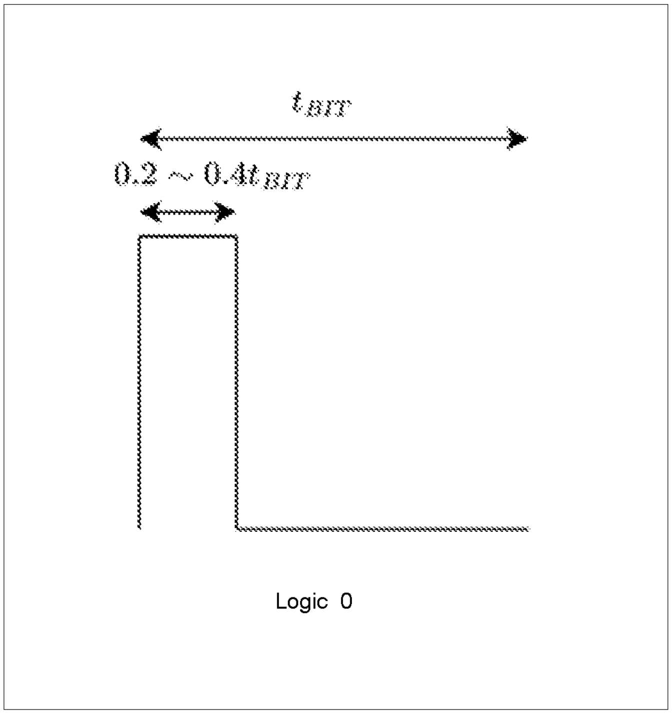
FIG. 3 is a schematic diagram of a waveform signal with a logical bit of 0 according to embodiments of the present disclosure.
Figure 4:
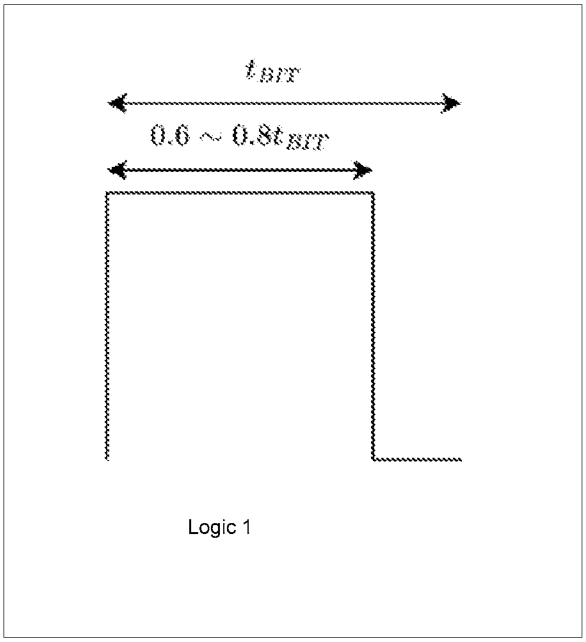
FIG. 4 is a schematic diagram of a waveform signal with a logical bit of 1 according to embodiments of the present disclosure.

As shown in FIG. 3, tBIT is a runtime corresponding to one piece of logical bit information, and when a logical bit of the logical bit information is 0, a signal corresponding to the logical bit information is a waveform with a duty ratio of about 1/4, wherein a holding time of a high level satisfies 0.2-0.4 tBIT. In addition, as shown in FIG. 4, when a logical bit of one piece of logical bit information is 1, a signal corresponding to the logical bit information is a waveform with a duty ratio of about 3/4, wherein a holding time of high level satisfies 0.6-0.8 tBIT.

It can be determined from the described content that in order to simulate the hardware interface signal in the software manner, the key point lies in realizing transformation of a waveform (whether logic 0 or logic 1, they both have waveform transformation of high and low levels). Therefore, in some embodiments of the present disclosure, waveform transformation is realized by the Reload Value and the Initial matching value of the timer. Optionally, in some embodiments of the present disclosure, on the one hand, the runtime of a logical bit, i.e. the runtime of one waveform signal, is controlled by the reload value; and on the other hand, the identification of different logical bits is realized by the initial matching value, that is, waveform signals corresponding to different logical bits have different duty ratios.

Optionally, based on a sequence of the multiple pieces of logical bit information corresponding to the request command, the first system needs to sequentially generate a hardware interface sub-signal corresponding to the each piece of logical bit information based on the reload value and the initial matching value which correspond to the each piece of logical bit information, to obtain the hardware interface signal.

For example, assuming that the request command corresponds to logical bit information 1, logical bit information 2, logical bit information 3, . . . , logical bit information i, . . . , logical bit information N, then the first system sequentially generates the hardware interface sub-signal corresponding to the each piece of logical bit information, i.e. hardware interface sub-signal 1, hardware interface sub-signal 2, hardware interface sub-signal 3, . . . , hardware interface sub-signal i, . . . , hardware interface sub-signal N. Finally, the hardware interface sub-signal 1, the hardware interface sub-signal 2, the hardware interface sub-signal 3, . . . , the hardware interface sub-signal i, . . . , the hardware interface sub-signal N are spliced into the hardware interface signal.

Figure 5:
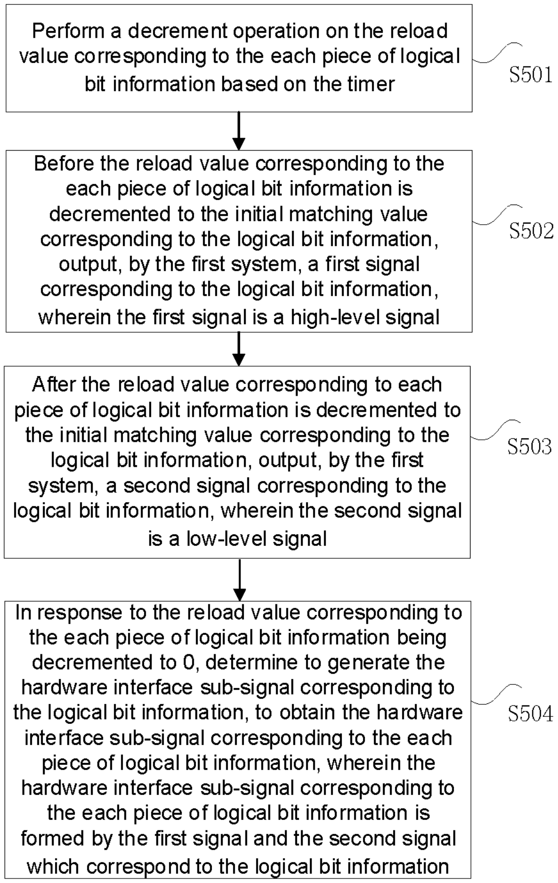
FIG. 5 is a flowchart of generating a hardware interface sub-signal according to embodiments of the present disclosure.

Optionally, a process of generating the hardware interface sub-signal corresponding to the each piece of logical bit information is as shown in FIG. 5:

- at step S501, performing a decrement operation on the reload value corresponding to each piece of logical bit information based on the timer;
- at step S502, before the reload value corresponding to the each piece of logical bit information is decremented to the initial matching value corresponding to the logical bit information, outputting, by the first system, a first signal corresponding to the logical bit information, wherein the first signal is a high-level signal;
- at step S503, after the reload value corresponding to the each piece of logical bit information is decremented to the initial matching value corresponding to the logical bit information, outputting, by the first system, a second signal corresponding to the logical bit information, wherein the second signal is a low-level signal; and
- at step S504, in response to the reload value corresponding to the each piece of logical bit information is decremented to 0, determining to generate the hardware interface sub-signal corresponding to the logical bit information, to obtain the hardware interface sub-signal corresponding to the each piece of logical bit information, wherein the hardware interface sub-signal corresponding to the each piece of logical bit information is formed by the first signal and the second signal which correspond to the logical bit information.

Optionally, according to the working principle of the timer, a down counter is provided inside the timer, and when the down counter is decremented to 0 along with a system clock, a timer interrupt is triggered, and at the same time, a reload value is automatically loaded and then decrementing count is performed again; in addition, when a decrementing count value is decremented to be equal to the initial matching value, an interrupt is also triggered, wherein the interrupt can be understood as an identifier; therefore, the interrupt can also be referred to as an interrupt identifier, a first interrupt can be referred to as a first interrupt identifier, and a second interrupt can be referred to as a second interrupt identifier. In some embodiments of the present disclosure, in order to achieve waveforms of logical bit 0 and logical bit 1, the reload value of the timer is set as a runtime tBIT corresponding to the logical bit information; at the same time, the initial matching value is set as 3xtBIT/4 to represent logic 0, and the initial matching value is set as 1xtBIT/4 to represent logic 1.

Hereinafter, a 10 kbps transmission rate is taken as an example to describe a software implementation process of the hardware interface sub-signal corresponding to the each piece of logical bit information:

- the Reload Value of the timer is set to be 100 ms;
- outputting a high level is set (each time a signal is generated, the signal needs to be pulled up to a high level);
- in response to a logical bit of one piece of logical bit information being 0, the value of the Initial matching value corresponding to the logical bit information is set as 75 ms;
- in response to a logical bit of one piece of logical bit information being 1, the value of the Initial matching value corresponding to the logical bit information is set as 25 ms;
- in response to a decrementing count value of the timer matches the initial matching value, outputting a low level by the first system; and
- in response to the reload value of the timer being decremented to 0, determining to generate a hardware interface sub-signal corresponding to the logical bit, and at the same time, the first system pulling up the low level to a high level, to continue generating a hardware interface sub-signal corresponding to a next piece of logical bit information.

From the described content, in some embodiments of the present disclosure, waveform transformation of a signal is realized by the Reload Value and the Initial matching value of the timer, thereby simulating to generate the hardware interface signal.

In some optional embodiments, in response to the reload value corresponding to the each piece of logical bit information being decremented to the initial matching value corresponding to the logical bit information, the first system further triggers a first interrupt corresponding to the logical bit information; and in response to the reload value corresponding to the each piece of logical bit information being decremented to 0, the first system also triggers a second interrupt corresponding to the logical bit information.

It should be noted that in some embodiments of the present disclosure, interrupt count may be achieved by recording the first interrupt and the second interrupt triggered corresponding to each piece of logical bit information, and then it is determined which field is a field which is currently to perform signal conversion in the request command based on the interrupt count.

Optionally, every time one first interrupt or second interrupt is triggered, the first system performs interrupt count once, and determines a field which is currently performing signal conversion processing in the request command based on the interrupt count, wherein the signal conversion processing is configured to generate the hardware interface sub-signal corresponding to logical bit information which corresponds to each field in the request command.

Optionally, the first system can acquire the number of bytes corresponding to each field in the request command; then determine the number of pieces of logical bit information corresponding to the request command based on the number of bytes, wherein each byte corresponding to the request command corresponds to one piece of logical bit information; then determine the number of interrupts corresponding to the request command based on the number of pieces of logical bit information, wherein the number of interrupts corresponding to the request command is twice the number of pieces of logical bit information; and finally determine the field which is currently performing signal conversion processing in the request command based on the number of interrupts and the interrupt count.

Figure 6:
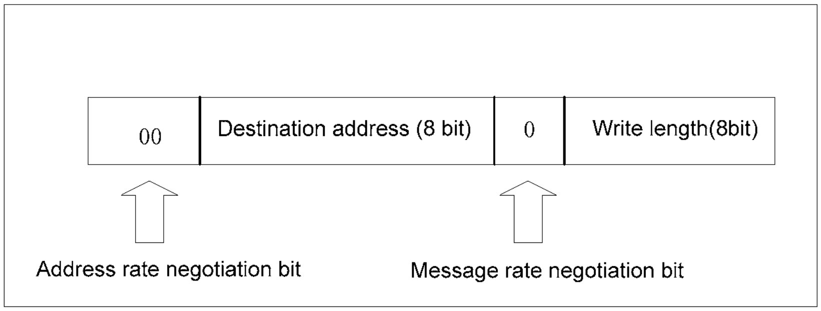
FIG. 6 is a schematic diagram of a request command according to embodiments of the present disclosure.

For example, as shown in FIG. 6, one request command includes four fields, which are respectively an address rate negotiation bit, a destination address (addr), a message rate negotiation bit, and a write length. The number of bytes corresponding to the address rate negotiation bits is 2, that is, the address rate negotiation bits are composed of 2 bits; the number of bytes corresponding to the target address (addr) is 8; the number of bytes corresponding to the message rate negotiation bits is 1; and the number of bytes corresponding to the write length is 8. Hence, the request command in FIG. 6 corresponds to 19 bytes in total, and since each byte corresponds to one piece of logical bit information, the request command corresponds to 19 pieces of logical bit information; and also since each logical bit information corresponds to two interrupts, the request command corresponds to 38 interrupts in total, that is, the number of interrupts of the request command is 38. On this basis, by the interrupt count, the first system can determine that the two bits of the address rate negotiation bit are processed by four interrupts, i.e. interrupts 0-3, and the write length field needs to be processed by 16 interrupts, i.e. 22-37.

Optionally, the first system determines logical bit information which is currently converted into the hardware interface sub-signal based on the number of interrupts and the interrupt count, and determines a byte corresponding to the logical bit information which is currently converted into the hardware interface sub-signal as a target byte, so that the first system determines that a field corresponding to the target byte is the field which is currently performing signal conversion processing in the request command.

For example, still taking the request command in FIG. 6 as an example, assuming that the current interrupt count is 4, then it can be determined that the logical bit information that is currently performing signal conversion is a second piece of logical bit information in the 19 pieces of logical bit information, and the target byte is the second byte in the 19 bytes; as the field corresponding to the second byte is the address rate negotiation bit, the first system can determine that the field which is currently performing signal conversion processing in the request command is the address rate negotiation bit.

In addition, it should also be noted that in some embodiments of the present disclosure, besides determining the field which is currently performing signal conversion processing through using an interrupt count manner, the field which is currently performing signal conversion processing, or the field which has completed the signal conversion processing or the field that has not completed the signal conversion processing, can also be determined through recording the number of times that the reload value is decremented to the initial matching value and the number of times that the reload value is decremented to 0.

Optionally, in some embodiments of the present disclosure, the field which has completed the signal conversion processing can also be separately recorded.

In addition, it should be noted that compared with determining the field which is currently performing signal conversion processing by recording the number of times that the reload value is decremented to the initial matching value and the number of times that the reload value is decremented to 0, or separately recording the field which has completed the signal conversion processing, the manner of determining the field which is currently performing signal conversion processing by using interrupt count can reduce the calculation workload of the first system, thereby achieving the technical effect of determining a field more conveniently and efficiently.

In some optional embodiments, the first system may also send the field which is currently performing signal conversion processing, the field which has completed the signal conversion processing or the field that has not completed the signal conversion processing to a display interface, so that when signal conversion fails, a worker can directly view the progress of signal conversion from the display interface, thereby assisting the worker to restore the signal conversion work as soon as possible. For example, the worker may send a control instruction to the first system, wherein the control instruction requires the first system perform signal conversion again from the field which is currently performing signal conversion processing when the signal conversion fails, and not perform signal conversion repeatedly on the field which has completed the signal conversion processing, thereby improving the signal conversion efficiency and avoiding waste of system computing resources.

In order to better illustrate the process of generating the hardware interface signal in some embodiments of the present disclosure, hereinafter, illustration is made by taking the hardware interface signal being the PECI signal as an example in combination with the accompanying drawings.

Figure 7:
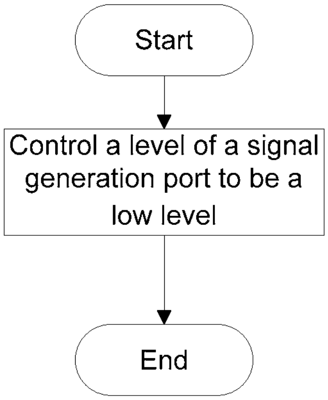
FIG. 7 is a flowchart of calling an initialization function according to embodiments of the present disclosure.

As shown in FIG. 7, first, the first system calls an initialization function, wherein main functions of the initialization function are an initialization function before transmission of the request command is completed, and to default a level state as a low level based on signal transmission protocol specifications, and therefore the initialization function is configured to control a level of a signal generation port to be a low level. The signal generation port can be a GPIO port.

Figure 8:
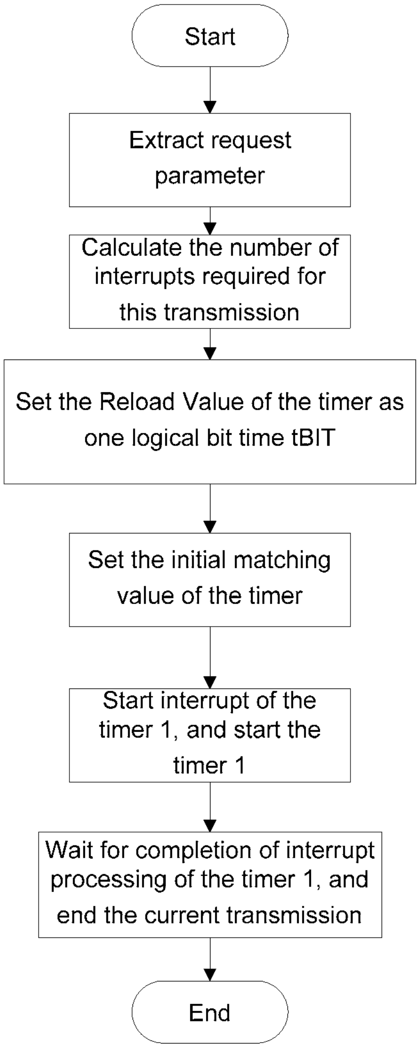
FIG. 8 is a flowchart of processing of a transfer function according to embodiments of the present disclosure.

Subsequently, the first system enters a transfer function processing process, and the steps thereof are as shown in FIG. 8:

- at step 1, first, the first system extracting request parameters, wherein the request parameters involved include a target address (addr), a write length (wl), a read length (rl), a command code (cmd) and a parameter (para) in the request command;
- at step 2, the first system calculating the number of interrupts required for this transmission, wherein transmission of each piece of logical bit information requires two interrupts for completion (one interrupt is generated when a decrementing count value reaches 0, and one interrupt is generated when the decrementing count value is equal to the initial matching value), the reload value is configured to define the start of the logical bit information, and the initial matching value is configured to control an outputted logical bit corresponding to the logical bit information to be 0 or 1;
- at step 3, the first system setting the Reload Value of the timer as one logical bit time tBIT;
- at step 4, the first system setting the Initial matching value of the timer to be 3×tBIT/4 time (corresponding to logic 0, since each transmission starts from logic 0);
- at step 5, the first system starting interrupt of a timer 1, and starting the timer 1; and
- at step 6, waiting for completion of interrupt processing of the timer 1, and ending the current transmission.

Figure 9:
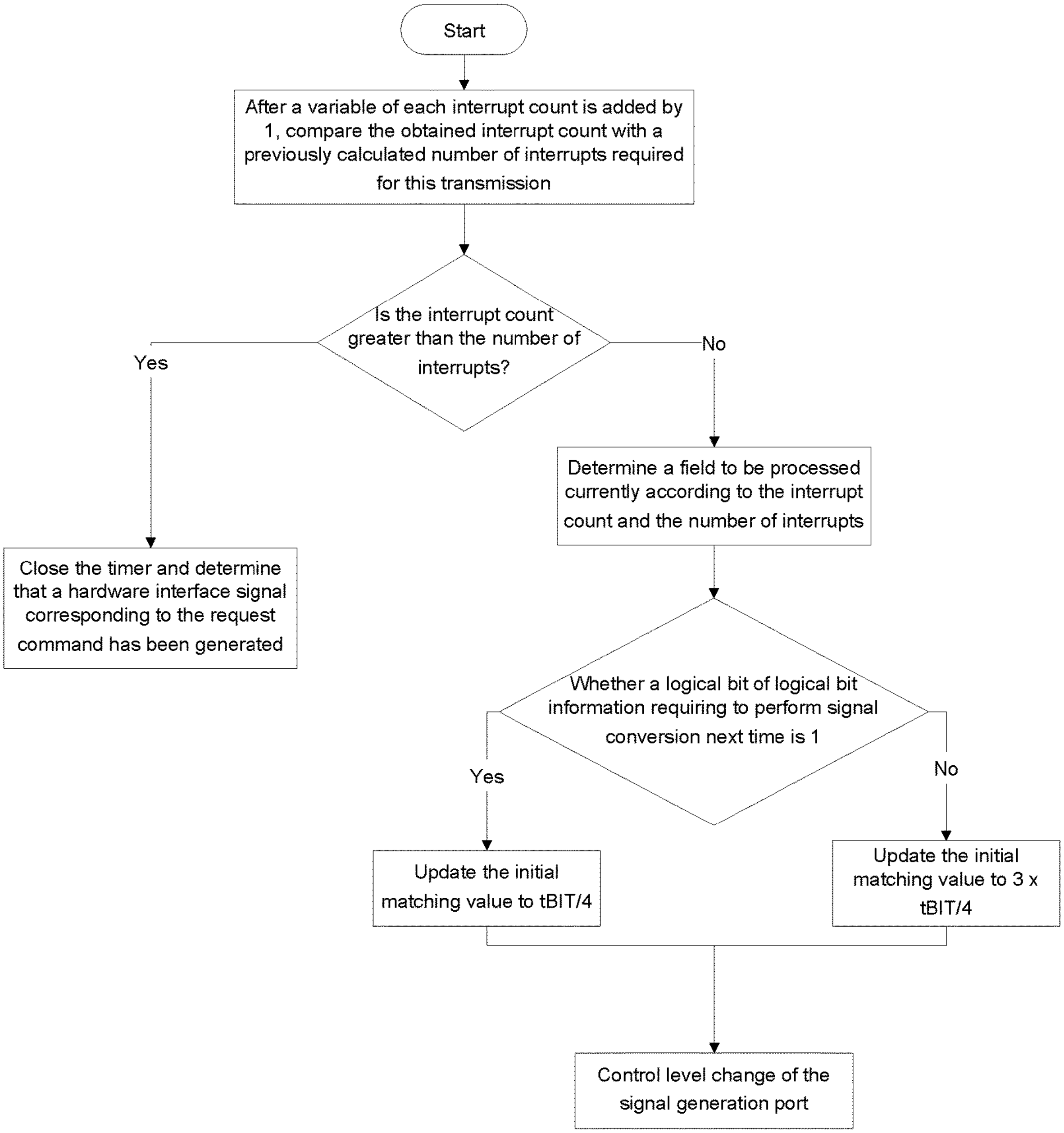
FIG. 9 is a processing flowchart of a timer interrupt function according to embodiments of the present disclosure.

Optionally, FIG. 9 shows a processing flowchart of a timer interrupt function according to embodiments of the present disclosure. As shown in FIG. 9, after a variable of each interrupt count is added by 1, the first system compares the obtained interrupt count with a previously calculated number of interrupts required for this transmission, and in response to the interrupt count being greater than the number of interrupts, the first system closes the timer and determines that a hardware interface signal corresponding to the request command has been generated. In response to the interrupt count being less than or equal to the number of interrupts, a field to be processed currently is determined based on the interrupt count and the number of interrupts, and it is determined whether a logical bit of logical bit information requiring to perform signal conversion next time is 1; and in response to the logical bit of logical bit information requiring to perform signal conversion next time is not 1, the initial matching value is updated to 3×tBIT/4, and in response to the logical bit of logical bit information requiring to perform signal conversion next time being 1, the initial matching value is updated to tBIT/4, to control level change of the signal generation port.

In some optional embodiments, a hardware interface system in some embodiments of the present disclosure can be implemented by dual systems, and optionally, the request data is acquired in response to the first system detects a first request triggered by a second system, wherein the first system and the second system run on the same processor, the request data is generated by the second system, and a service response speed of the second system is less than a service response speed of the first system. Finally, the first system parses the request data, to obtain the request command.

Optionally, the second system can be various types of software systems, for example, a Linux system, and the type of the second system is not defined more in some embodiments of the present disclosure. In addition, in order to smoothly and continuously generate the hardware interface signal, idle computing resources of the first system are greater than idle computing resources of the second system; in other words, in some embodiments of the present disclosure, the system with more idle resources is selected to generate the hardware interface signal, thereby avoiding the problem that the hardware interface signal cannot be continuously generated due to insufficient system resources.

In some other optional embodiments, idle computing resources of the first system can be set to be greater than a preset threshold, wherein the preset threshold is configured to characterize a maximum computing resource value required when the hardware interface signal is continuously generated.

Optionally, before the request data is acquired, in some embodiments of the present disclosure, the second system stores the request data in a target memory, and after the request data is stored, the second system triggers the first request, wherein the first request is configured to notify the first system of reading the request data from the target memory, and the target memory is a memory that can be accessed by both the first system and the second system.

Figure 10:
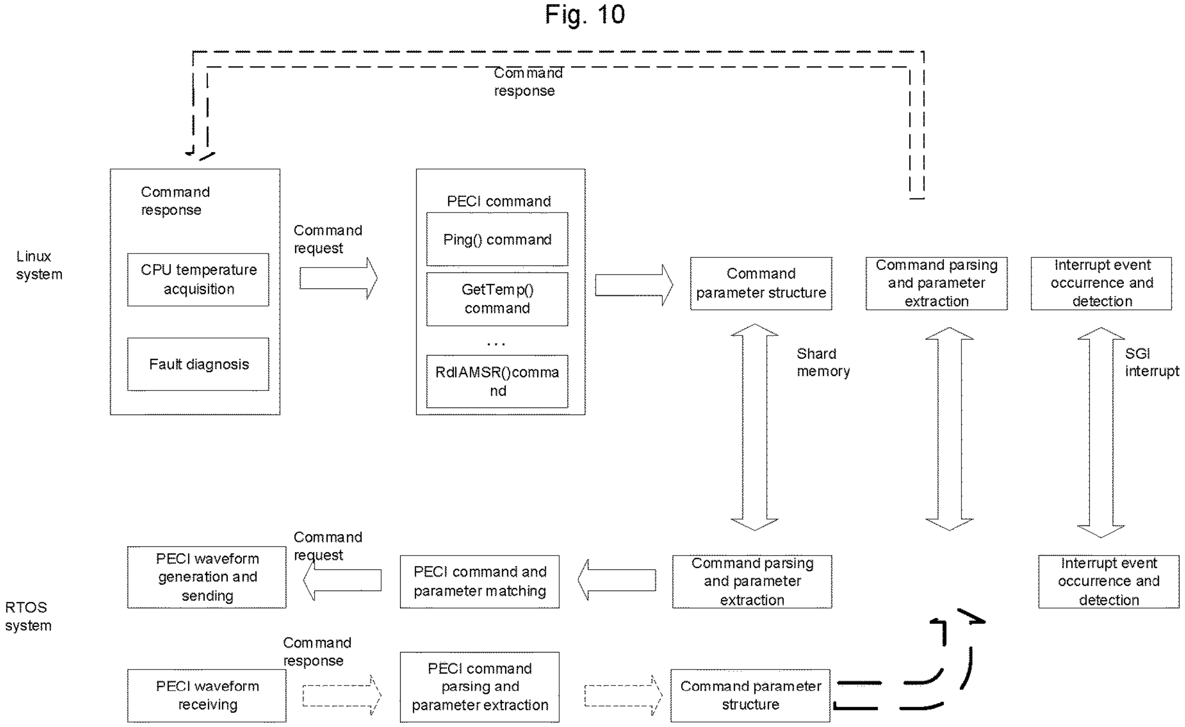
FIG. 10 is an interaction diagram of a dual system according to embodiments of the present disclosure.

As shown in FIG. 10, the first system being an RTOS system, the second system being a Linux system, and the hardware interface signal being the PECI signal are taken as an example. In some embodiments of the present disclosure, a software processing flow of a PECI communication protocol in a chip is divided into two processes, i.e. command request and command response, and the two processes are respectively described in detail below.

As shown in FIG. 10, with regard to a command request process, first, an upper-layer application involving PECI services (such as fault diagnosis and CPU temperature acquisition) in a Linux system actively initiates PECI request commands based on requirements, wherein these request commands comprise but are not limited to, a basic Ping( ) command, a command for acquiring a CPU temperature and a command for reading information of an MSR register, etc., and code implementation of different PECI request commands is completed by corresponding interface functions.

Optionally, the Linux system uses a command parameter structure module in FIG. 10 to write request data such as a target address, a read/write length, a command code, and a para parameter of each request command into the target memory according to PECI protocol specifications, and after all the request data is written into the target memory, the Linux system generates a first request by using an interrupt event occurrence and detection function module in FIG. 10 to notify an RTOS system. The first request may be a Software Generated Interrupt (SGI, a communication interrupt request between processor cores) interrupt request.

It should be noted that in the process of storing the request data into the target memory by the second system, the second system stores the request data into the target memory in the form of a first data structure, wherein the first data structure at least includes a device address, a write length, a read length, a command code and a request parameter, the device address is configured to characterize an address of a target device, the target device is a device generating response data according to the hardware interface signal, the command code is configured to distinguish different request commands, the write length is configured to characterize the number of bytes from the start of the command code to the end of the request data, the read length is configured to characterize the number of bytes containing a completion code and read data in the request data, and the request parameter is configured to characterize a parameter of the request command.

As shown in Table 1, Table 1 shows an example of an optional data structure (corresponding to the first data structure) of request data.

TABLE 1

| Number | Member variable | Type | Meaning |
|---|---|---|---|
| 1 | Device address | unsigned char | Address of a target device, having a value range of 0x30-0x37, which correspond to CPU0-CPU7 respectively |
| 2 | Write length | unsigned char | The number of bytes from the start of a command code to the end of request data |
| 3 | Read length | unsigned char | The number of bytes containing a completion code and read data |
| 4 | Command code | unsigned char | Used for distinguishing different request commands |
| 5 | Request parameter | unsigned char[32] | Parameter part of request command |

Optionally, as shown in FIG. 10, after detecting the first request triggered by the Linux system, the RTOS system reads the request data in the target memory, and then completes a data parsing process by using a command parsing and parameter extraction function module in FIG. 10. Then, a PECI command and parameter matching function module establishes a corresponding PECI request command and command parameters based on the parsed data, and finally sends a PECI signal from a GPIO port of BMC by a PECI waveform generation and sending module in FIG. 10.

In some optional embodiments, the first system can also receive response data corresponding to the hardware interface signal, wherein a transmission form of the response data is the same as a transmission form of the hardware interface signal. Secondly, the first system also adjusts the data structure of the response data to a second data structure.

In addition, after the data structure of the response data is adjusted to the second data structure, in some embodiments of the present disclosure, the first system triggers a second request, wherein the second request is configured to notify the second system of reading the response data.

Optionally, the hardware interface signal being the PECI signal is still taken as an example, and FIG. 10 further shows a command response process. As shown in FIG. 10, firstly, the RTOS system receives the response data transmitted from a PECI bus, and then a PECI command parsing and parameter extraction function module in FIG. 10 completes data parsing, to convert a signal form of the response data from the form of the hardware interface signal to the form of a software signal. For example, waveform change between a high-level signal and a low-level signal in the hardware interface signal is identified, to obtain corresponding logical bit information, and obtain software signal data on the basis of the logical bit information. The parsed response data is adjusted by the command parameter structure module and written into the target memory. After all the parsed response data is completely written, an interrupt event occurrence and detection module of the RTOS system triggers a second request to notify the Linux system. The Linux system detects the second request, actively reads the parsed response data stored in the target memory, and the data is processed by a command parsing and parameter extraction module and then returned to the upper-layer application. The second request is also an SGI interrupt request.

It should be noted that a shared memory in FIG. 10 is the target memory in some embodiments of the present disclosure; in some embodiments of the present disclosure, in addition to being the shared memory, the target memory can also be other memories, such as a Random Access Memory (RAM for short), a flash memory (Flash), and so on.

In some optional embodiments, in view of the fact that the first request and the second request can both be interrupt requests (for example, SGI interrupt requests), hereinafter, interrupt requests are described below.

Optionally, preemption and release of processing resources between different operating systems may be completed by inter-core interrupt, for example, the SGI interrupt request; and one operating system can also send a resource preemption request (for example, a core preemption request) or a resource release request (for example, a core release request) to another operating system by an Inter-Processor Interrupt (IPI), to request preemption or release of processing resources. Taking the Linux system as an example, in the Linux system, inter-core communication can be achieved on the basis of a self-defined interrupt vector table and an interrupt event between heterogeneous operating systems. Herein, the IPI is an interrupt triggered between multiple cores in an System on Chip (SOC, a system-level chip, also referred to as a system on chip), and is different from a common peripheral interrupt; therefore, each core can reserve partial interrupt numbers for the IPI, and the partial interrupt numbers are 16 interrupt numbers 0-15 in an ARM 64 architecture (a CPU architecture).

In some embodiments, a first interaction request of a first operating system (which may correspond to the described first system) can be transmitted to a second operating system via an inter-core communication interface, and the processing method includes at least one of the following:

a first preemption request with an interrupt number of a first interrupt number is transmitted to the second operating system (which may correspond to the described second system) via the inter-core communication interface, wherein the first preemption request is configured to request to preempt processing resources of the second operating system; and a resource release request with an interrupt number of a second interrupt number is transmitted to the second operating system via the inter-core communication interface, wherein the resource release request is configured to request to release processing resources occupied by the first operating system to the second operating system.

In this embodiment, the preemption and release of processing resources between different operating systems can be completed by the inter-core interrupt, different interrupt events can be defined for different resource interaction types, and different interrupt events can correspond to different interrupt numbers; wherein an interrupt number allocated to a first interrupt event due to the first operating system applying for preempting processing resources to the second operating system is the first interrupt number, and an interrupt number allocated to a second interrupt event due to the first operating system actively releasing processing resources to the second operating system is the second interrupt number.

As some optional embodiments, the first interaction request can be the first preemption request, i.e. a request for requesting to preempt processing resources of the second operating system; the first operating system can transmit the first preemption request with the interrupt number of the first interrupt number to the second operating system by the inter-core communication interface; that is, a trigger source of the inter-core communication interrupt with the interrupt number of the first interrupt number is the first operating system, a response source is the second operating system, and the meaning of the inter-core communication interrupt is that the first operating system preempts processing resources of the second operating system.

As some other optional embodiments, the first interaction request can be the resource release request, i.e. used for requesting to release the processing resources occupied by the first operating system to the second operating system; the first operating system can transmit the resource release request with the interrupt number of the second interrupt number to the second operating system by the inter-core communication interface; that is, a trigger source of the inter-core communication interrupt with the interrupt number of the second interrupt number is the first operating system, a response source is the second operating system, and the meaning of the inter-core communication interrupt is that the first operating system actively releases processing resources to the second operating system.

By the present embodiment, by allocating interrupt numbers for preemption and active release of processing resources between different operating systems, resource scheduling between the operating systems is performed by an inter-core communication interrupt manner, thereby improving the accuracy of resource scheduling.

In some embodiments, a second interaction request of the second operating system is transmitted to the first operating system by the inter-core communication interface, includes:

the second preemption request with an interrupt number of a third interrupt number is transmitted to the second operating system by the inter-core communication interface, wherein the second preemption request is configured to request to preempt processing resources of the first operating system.

In this embodiment, similar to the embodiments above, the preemption and release of processing resources between different operating systems can be completed by the inter-core interrupt, different interrupt events may be defined for different resource interaction types, and different interrupt events may correspond to different interrupt numbers; wherein an interrupt number allocated to a third interrupt event due to the second operating system applying for preempting processing resources to the first operating system is the third interrupt number.

Optionally, the second interaction request can be a second preemption request, i.e. a request for requesting to preempt the processing resources of the first operating system; the second operating system can transmit the second preemption request with the interrupt number of the third interrupt number to the first operating system by the inter-core communication interface; that is, a trigger source of the inter-core communication interrupt with the interrupt number of the third interrupt number is the second operating system, a response source is the first operating system, and the meaning of the inter-core communication interrupt is that the second operating system preempts processing resources of the first operating system.

By the present embodiment, by allocating interrupt numbers for preemption of processing resources between different operating systems, resource scheduling between the operating systems is performed by the inter-core communication interrupt manner, thereby improving the accuracy of resource scheduling.

In some exemplary embodiments, a second interaction response returned by the first operating system in response to the second interaction request can also be acquired by the inter-core communication interface, including at least one of:

a resource release allowing response with an interrupt number of a fourth interrupt number is transmitted to the second operating system by the inter-core communication interface, wherein the resource release allowing response is configured to indicate that the first operating system allows the second operating system to preempt processing resources of the first operating system; and a resource release denying response with an interrupt number of a fifth interrupt number is transmitted to the second operating system by the inter-core communication interface, wherein the resource release denying response is configured to indicate that the first operating system denies the second operating system to preempt the processing resources of the first operating system.

In this embodiment, similar to the embodiments above, the preemption and release of processing resources between different operating systems can be completed by the inter-core interrupt, different interrupt events can be defined for different resource interaction types, and different interrupt events can correspond to different interrupt numbers; wherein the interrupt number allocated to the fourth interrupt event and the fifth interrupt event due to the second operating system applying for returning a resource preemption response to the second operating system is the fifth interrupt number, wherein the fourth interrupt event is an interrupt event allowing resource preemption, and the fifth interrupt event is an interrupt event denying resource preemption.

As some optional embodiments, in response to the first operating system determines that the second operating system is allowed to occupy at least a part of the processing resources of the first operating system, the first operating system can transmit a resource release allowing response with the interrupt number of the fourth interrupt number to the second operating system by the inter-core communication interface; that is, a trigger source of the inter-core communication interrupt with the interrupt number of the fourth interrupt number is the first operating system, a response source is the second operating system, and the meaning of the inter-core communication interrupt is that the first operating system passively releases processing resources to the second operating system.

As some optional embodiments, in response to the first operating system determines to deny the second operating system to occupy the processing resources of the first operating system, the first operating system may transmit a resource release denying response with an interrupt number of the fifth interrupt number to the second operating system by the inter-core communication interface; that is, a trigger source of the inter-core communication interrupt with the interrupt number of the fifth interrupt number is the first operating system, a response source is the second operating system, and the meaning of the inter-core communication interrupt is that the first operating system denies release of processing resources to the second operating system.

By the present embodiment, by allocating interrupt numbers for allowing preemption of processing resources and denying preemption of processing resources between different operating systems, resource scheduling between the operating systems is performed by the inter-core communication interrupt manner, thereby improving the accuracy of resource scheduling.

As an optional example, the inter-core communication interrupt is explained and illustrated below by taking the RTOS system and the Linux system as examples. In the Linux system, inter-core communication can be achieved on the basis of a self-defined interrupt vector table and an interrupt event between heterogeneous operating systems. The Linux operating system fully uses bit numbers not defined by the SGI to achieve customization of a terminal signal, thereby reducing the cost of inter-core communication. The undefined bit numbers may be numbers 8-15. In a multi-core heterogeneous operating system, in order to be compatible with a current resource allocation manner to the greatest extent, numbers 8-15 (8 interrupts in total) are configured to characterize an inter-core interrupt vector table. A feasible allocation solution of the vector table is shown in Table 2:

TABLE 2

| Number | Interrupt number | Trigger source | Response source | Meaning |
|---|---|---|---|---|
| 1 | 8 | RTOS core | Linux core | An RTOS system actively releases a CPU core |
| 2 | 9 | Linux core | RTOS core | A Linux system requests takeover of a CPU core |
| 3 | 10 | RTOS core | Linux core | The RTOS system passively releases a CPU core |
| 4 | 11 | RTOS core | Linux core | The RTOS system denies release of a CPU core |
| 5 | 12 | RTOS core | Linux core | The RTOS preempts a CPU core |

The first interrupt number above corresponds to interrupt number 12, the second interrupt number above corresponds to interrupt number 8, the third interrupt number above corresponds to interrupt number 9, the fourth interrupt number above corresponds to interrupt number 10, and the fifth interrupt number above corresponds to interrupt number 11.

As shown in Table 2, active release refers to: in response to the RTOS system has no service scheduling (i.e. in an idle state), an SGI interrupt with an interrupt number of 8 is sent to the Linux system, and at this time, a core resource of the RTOS will be taken over by the Linux system, and the RTOS system enters a dormant state; and passive release refers to: in response to a service load of the Linux system rapidly increases, an SGI interrupt with an interrupt number of 9 is sent to the RTOS system; in response to a process which is being executed by the RTOS system at this time is allowed to be interrupted (processes on the RTOS system all have priorities, and can be configured according to actual situations; in response to the priority of a process being higher than that of interrupt 9, the process cannot be interrupted, and in response to the priority being lower than that of the interrupt 9, the process can be interrupted), then the RTOS system will send an SGI interrupt with an interrupt number of 10 to the Linux system, and passively releases CPU core resources occupied thereby for scheduling and use by the Linux system; then, the RTOS system enters a dormant state, and in response to the RTOS system is not allowed to be interrupted at this time, the RTOS system will send an SGI interrupt with an interrupt number of 11 to the Linux system, thereby notifying the Linux system that core resources of the RTOS cannot be released at this time, and in this case, the Linux system continues to execute based on the current running policy without changing.

It should be noted that an inter-core communication vector table is not unique, and is not limited to the inter-core communication vector table defined in Table 2 above.

Optionally, the second data structure at least includes: a first check value, a second check value and response validity data, wherein the first check value is configured to characterize a check value in the request data, the second check value is configured to characterize a check value in the response data, the response validity data is configured to characterize a completion code in the response data and data for describing a state of the target device, and the target device is a device generating the response data according to the hardware interface signal.

As shown in Table 3, Table 3 shows an example of an optional data structure (corresponding to the second data structure) of the response data.

TABLE 3

| Number | Member variable | Type | Meaning |
|---|---|---|---|
| 1 | FCS1 (first check value) | unsigned char | CRC-8 check value of request part |
| 2 | Response valid data part | unsigned char[32] | Contain a completion code and response data |
| 3 | FCS2 (second check value) | unsigned char | CRC-8 check value of response part |

Optionally, Table 4 shows examples of the first request and the second request.

TABLE 4

| Number | Interrupt request number. | Name of interrupt request | Meaning |
|---|---|---|---|
| 1 | 14 | peci_rsp_intrpt (second request) | The first system notifies the second system that preparation of response data of the shared memory is completed |
| 2 | 15 | peci_req_intrpt (first request) | The second system notifies the first system that preparation of request data of the shared memory is completed |

In some optional embodiments, after the hardware interface signal corresponding to the request command is generated, based on the logical bit information and the timer, the first system can convert a voltage of the hardware interface signal, to obtain a target hardware interface signal.

Optionally, the first system can input the hardware interface signal into a voltage conversion device, to obtain the target hardware interface signal outputted by the voltage conversion device.

Optionally, the voltage conversion device can be a Complex Programmable Logic Device (CPLD), and the CPLD can be connected to the target device, wherein the target device can be a Central Processing Unit (CPU) in a server.

Figure 11:
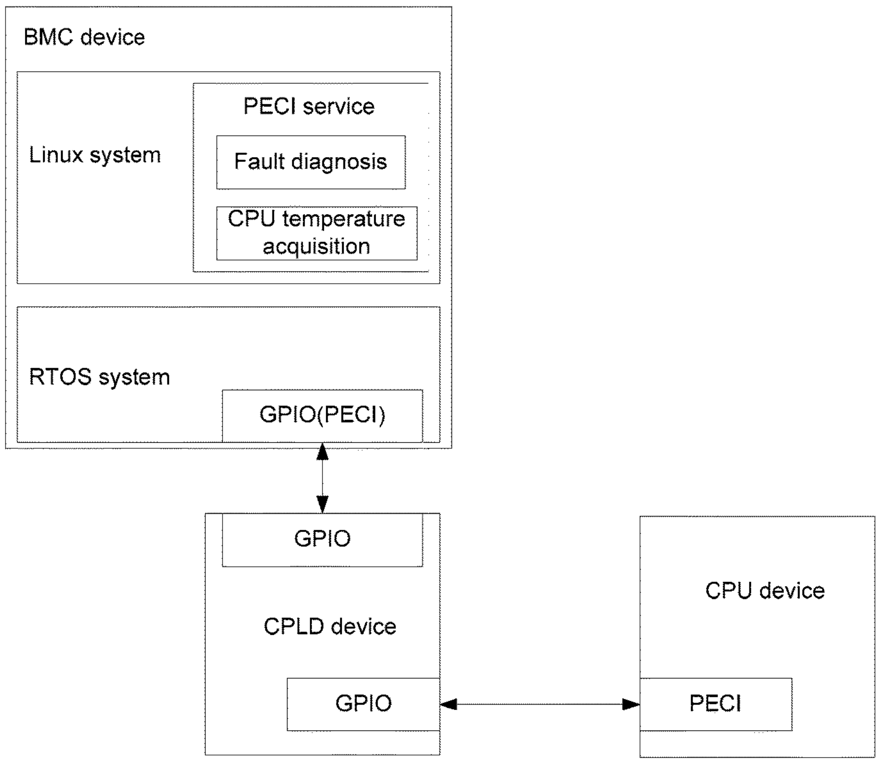
FIG. 11 is a hardware topology architecture diagram for simulation to generate a hardware interface signal according to embodiments of the present disclosure.

Taking the hardware interface signal being the PECI signal and a chip being the BMC chip as an example, FIG. 11 shows a hardware topology architecture diagram for simulation to generate a PECI signal based on some embodiments of the present disclosure. As shown in FIG. 11, two software systems run on the BMC chip (corresponding to a BMC device in FIG. 11), which are a Linux system and an RTOS system respectively (the two systems may run on different BMC cores respectively), wherein the Linux system is configured to process a conventional management service of the BMC and PECI services. The PECI services of the method mentioned run as the upper-layer application in the Linux system. When there is a demand for service data interaction (for example, the BMC initiates collection of fault register information), the Linux system interacts with the RTOS system, to start a GPIO port in the RTOS, and the RTOS system simulates a PECI software module to generate the PECI signal.

It should be noted that, at this time, the PECI signal sent from the GPIO port of the BMC can fail to meet the electrical characteristic requirement of a PECI protocol. For example, an operating voltage of the CPU is 5 V, but a voltage of the signal outputted by the GPIO port of the BMC is 3.3 V. In consideration of the implementation of universality, in some embodiments of the present disclosure, the generated PECI signal can be inputted into one GPIO port of the CPLD, and then voltage conversion is performed by internal logic of the CPLD, and a converted PECI waveform meets requirements of the PECI protocol and meets a voltage requirement corresponding to the target device (for example, a voltage of the converted PECI signal is 3.3V). Finally, another GPIO port of the CPLD outputs the PECI signal, and the GPIO port is physically connected to a standard PECI interface on the CPU side.

It should be noted that in addition to being able to be applied to generate the PECI signal by replacing the PECI interface, the solutions of some embodiments of the present disclosure can also be applied to other hardware interfaces.

In some optional embodiments, Table 5 shows multiple hardware interfaces supported by the embodiments of the present disclosure.

TABLE 5

| Number | Interface name | Description |
|---|---|---|
| 1 | Ping | Detect whether a CPU is online |
| 2 | GetDIB | Acquire a device identifier block of a CPU |
| 3 | GetTemp | Acquire CPU temperature |
| 4 | RdPkgConfig | Access a PCS space of a CPU |
| 5 | WrPkgConfig | Access a PCS space of a CPU |
| 6 | RdIAMSR | Access an MSR register of a CPU |
| 7 | RdIAMSREx | Access an MSR register of a CPU |
| 8 | WrIAMSR | Access an MSR register of a CPU |
| 9 | RdPCIConfig | Access a PCI configuration space |
| 10 | WrPCIConfig | Access a PCI configuration space |
| 11 | RdPCIConfigLocal | Access a Local PCI configuration space |
| 12 | WrPCIConfigLocal | Access a Local PCI configuration space |
| 13 | RdEndPointConfig | Access endpoint configuration |
| 14 | WrEndPointConfig | Access endpoint configuration |
| 15 | CrashDump | Access a CPUCrashDump Register |

Figure 12:
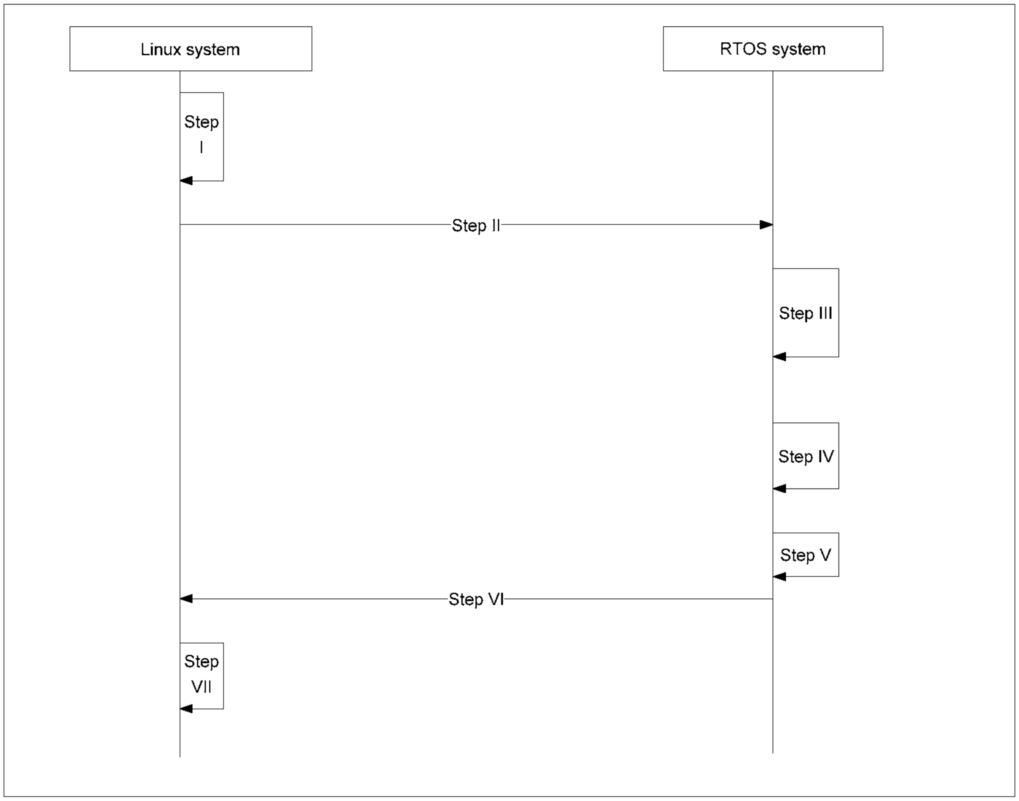
FIG. 12 is an optional interaction diagram between a first system and a second system according to embodiments of the present disclosure.

In some optional embodiments, FIG. 12 is an optional interaction diagram between a first system and a second system according to embodiments of the present disclosure. As shown in FIG. 12, the steps of interaction between the Linux system (corresponding to the second system) and the RTOS system (corresponding to the first system) are as follows:

at step I: as an initiator and a user of the request command, the Linux system first storing request data in the target memory before the request command is triggered;

at step II: the Linux system triggering a first request to notify the RTOS system that preparation of PECI request data is completed;

at step III: after the first request is received, the RTOS system reading the request data from the target memory, and generating the hardware interface signal according to the request data;

at step IV: the RTOS system receiving response data corresponding to the hardware interface signal;

at step V: the RTOS system storing the received response data into the target memory;

at step VI: the RTOS triggering a second request to notify the Linux system that preparation of response data is completed; and at step VII: the Linux system acquiring the response data from the target memory and parsing same.

It can be determined from the described content that in some embodiments of the present disclosure, the first system and the second system of an embedded system are combined, to achieve data interaction in the embedded system by the inter-core interrupt and the shared memory; a waveform generation function module of the request command is constructed in the RTOS system, and hardware interface signal communication is performed between the embedded system and external devices by software simulation. In addition, some embodiments of the present disclosure fully utilize high real-time characteristic of the RTOS system, thereby ensuring the accuracy of timing when simulating a request command waveform, and having the characteristics of flexibility and high-efficiency. By the solutions of some embodiments of the present disclosure, the design difficulty of a chip can be significantly reduced; since software simulation is configured to generate the hardware interface signal, more possibilities are provided for an optimized design of a communication function and other service functions in the embedded system; meanwhile, since a controller dedicated for realizing hardware interface signal communication in a chip is omitted, the design cost and manufacturing cost of the chip can be reduced.

In some optional embodiments, some embodiments of the present disclosure further provide a start control process of an operating system, the process including the following steps: at step A, a hardware controller of a target device is controlled via a first bus by a first operating system running on a first processor core of a processor, to control a running state of the target device.

For devices such as a server, a personal computer, or an industrial personal computer, some devices can be equipped to execute operations related to running of the device. In the related art, generally, these devices start to work after the system is powered on. However, after the system is powered on, the operating system running on the processor can normally take over the devices after a period of time and control the running state of the devices, but the devices are uncontrollable in the process of starting the operating system.

For example, a fan starts to work after the system is powered on, but after the system is powered on, the operating system running on the CPU can take over the fan normally after a period of time and set the rotation speed of the fan, and thus the fan is uncontrollable in the process of starting the operating system.

For example, in order to make the fan controllable during the start of the operating system, the server adopts a control manner of BMC combined with CPLD, the personal computer adopts a control manner of an Embedded Controller (EC) chip (a function of the EC chip adjusting the rotation speed of the fan according to temperature), and the industrial personal computer adopts a control manner of a customized chip; and in the process of starting operating systems of the server, the personal computer and the industrial personal computer, the CPLD, the EC chip and the customized chip will intervene to control the rotation speed of the fan, and after the operating systems are completely started, the control right of the fan will be handed over to application programs in the operating systems for control.

In order to at least partially solve the described technical problem, a start control manner of a multi-core multi-system (for example, a multi-core dual-system) may be adopted, different operating systems of an embedded system run on different processor cores of a processor, and different operating systems have different response speeds. For situations in which the second operating system is not started, restarted or the second operating system cannot control the running state of the devices, the first operating system having a higher response speed than that of the second operating system can control the running state of the devices, which can reduce the situation in which the running state of the devices is uncontrollable; and at the same time, no additional cost needs to be added, and furthermore, good extensibility is also achieved.

In this embodiment, for situations in which the second operating system is not started, restarted or the second operating system cannot control the running state of the target device, the first operating system can control a hardware controller of the target device by the first bus, so as to control the running state of the target device. The target device herein may be a fan, or other devices that need to be operated when starting the system. As for the fan, a corresponding hardware controller thereof is a fan controller, for example, a Pulse Width Modulation (PWM) controller and a fan rotation speed controller. Here, the first operating system (for example, the RTOS system) is configured to replace conventional CPLD, the EC chip, and the customized chip, and thus, on the one hand, hardware costs are saved, and on the other hand, as device control is achieved by software, the extensibility thereof is relatively high.

For example, dual systems, i.e. the RTOS system and the Linux system are achieved on the basis of a BMC dual core, the fan is achieved on the basis of a multi-core dual-system; and by using a high real-time characteristic of the RTOS system, in the process of starting the Linux system, the RTOS system may replace the CPLD, the EC chip, and the customized chip to control the fan, that is, taking over a fan control right, and controlling the running state of the fan at a high enough speed.

At step B, the second operating system on a second processor core of the processor is booted start.

In response to the system being powered on or the second operating system being restarted, the second operating system can be booted to be started on the second processor core of the processor, so that the second operating system runs on the second processor core. Herein, starting the second operating system on the second processor core refers to scheduling the second processor core to the second operating system, wherein a system file or an image file of the operating system can be stored on a chip where the processor is located or in a memory outside the chip, for example, an external Random Access Memory (RAM).

At step C, after the second operating system is started, the second operating system taking over the hardware controller by the first bus, to take over the control right of the target device.

After starting of the second operating system is completed, the first operating system can always control the running state of the target device. Considering that running a plurality of operating systems on a multi-core processor requires data interaction between the plurality of operating systems and for facilitating overall control of the device by one operating system, the second operating system may also take over the control right of the target device. For example, the hardware controller can be taken over via the first bus by the second operating system. The manner in which the second operating system takes over the control right of the target device can be: after the second operating system is started, the second operating system sends a device takeover request to the first operating system, for example, an interrupt request is sent by a second bus to request to take over the hardware controller of the target device. The first operating system can receive the device takeover request sent by the second operating system, hand over the control right of the target device to the second operating system, and can also execute operations related to the takeover of the control right of the target device, for example, stopping running a service (process) for controlling the running state of the target device.

For example, after the Linux system is completely started, the RTOS system hands over the control right of the fan to the Linux system, and the Linux system controls the fan. The process above can be executed after the system is powered on, that is, the RTOS system is started first by using a multi-core dual-system start manner, which facilitates early intervention of fan control; and after the Linux system is completely started, the RTOS system hands over the control right of the fan to the Linux system for control.

In some exemplary embodiments, before a hardware controller of a target device is controlled via the first bus by the first operating system running on the first processor core of the processor, the process further includes: after a chip on which the processor is located is powered on, the processor waking up the first processor core; and running a boot loader program of the first operating system by the first processor core to boot the start of the first operating system on the first processor core.

The whole system can be divided into two stages, i.e. an initial start stage and a real-time running stage based on a working period; the start control method in this embodiment may be executed in the initial start stage or the real-time running stage. With regard to the initial start stage, the initial start stage starts from powering on of the system, i.e. powering on the chip where the processor is located; after the system is powered on, one core is woken up to execute a booting action of the operating system, and the remaining cores are temporally in a dormant state; and the woken-up core can be the first processor core.

Optionally, after powering on, the system will first execute a preset core scheduling policy (a start booting policy), that is, one processor core of the processor executes a core scheduling policy; the core scheduling policy may be stored in an RAM or a non-transitory flash memory (Nor-flash) on an SOC chip; the scheduling policy can be flexibly configured according to different design requirements, and the main functions thereof include: specifying initial processing resources (processor cores) required to run by different operating systems, determining a booting process of a heterogeneous operating system; and powering on of the chip may refer to powering on at an SOC chip level.

After the first processor core is woken up, the first operating system can be booted to run on the first processor core by the bootloader program. The first processor core boots the first operating system to be started on the first processor core by the bootloader program. The Boot Loader program may be located on a computer or other computer applications, and refers to a program for booting loading of an operating system, for example, an inherent program in BootRom; wherein the inherent program refers to codes for booting start of the operating system and belongs to a BootLoader program, and the BootRom is a small mask ROM (Read-Only Memory) embedded in a processor chip on a CPU chip or a write-protection flash memory.

In the initial start stage, the bootloader program boots start of the operating system on a corresponding processor core, which can improve the success rate of starting the operating system while preparing for a real-time running stage.

It should be noted that for brevity of description, the method embodiments above are described as a series of action combinations. However, a person skilled in the art should understand that some embodiments of the present disclosure are not limited to the described sequence of actions, because according to some embodiments of the present disclosure, some steps may be performed in other sequences or performed simultaneously. Secondly, a person skilled in the art should also know that the embodiments described in the description are all preferred embodiments, and the involved actions and modules are not necessarily required in some embodiments of the present disclosure.

From the description of the embodiments above, a person skilled in the art would have been able to clearly understand that the method in the embodiments above may be implemented by using software and necessary general hardware platforms, and of course may also be implemented using hardware, but in many cases, the former is a better embodiment. On the basis of such understanding, the portion of the technical solutions of some embodiments of the present disclosure that contributes in essence or contributes to the related art may be embodied in the form of a software product. The computer software product is stored in a storage medium (such as an ROM/RAM, a magnetic disk and an optical disc), and includes several instructions for enabling a terminal device (which may be a mobile phone, a computer, a server, or a network device, etc.) to execute the methods as described in various embodiments of the present disclosure.

Figure 13:
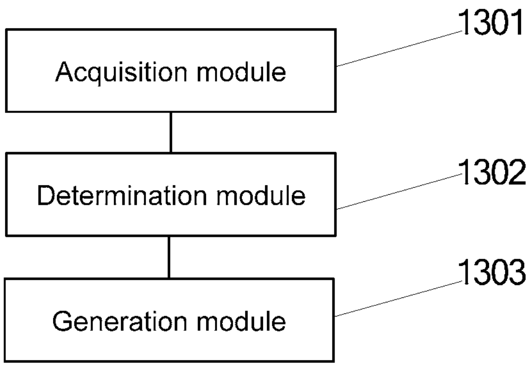
FIG. 13 is a schematic diagram of an optional apparatus for generating a hardware interface signal according to embodiments of the present disclosure.

According to embodiments of the present disclosure, also provided is an apparatus for generating a hardware interface signal for implementing the method for generating the hardware interface signal above. As shown in FIG. 13, the apparatus for generating the hardware interface signal comprises: an acquisition module 1301, a determination module 1302, and a generation module 1303.

Optionally, the acquisition module 1301 is configured to acquire, by a first system, a request command; the determination module 1302 is configured to determine multiple pieces of logical bit information corresponding to the request command; and the generation module 1303 is configured to generate a hardware interface signal corresponding to the request command based on the multiple pieces of logical bit information and a timer.

In the apparatus for generating the hardware interface signal according to embodiments of the present disclosure, the generation module includes: a first determination unit and a second generation unit. The first determination unit is configured to determine a reload value and an initial matching value correspond to the timer based on the multiple pieces of logical bit information; and the second generation unit is configured to generate a hardware interface signal corresponding to the request command based on the reload value and the initial matching value.

In the apparatus for generating the hardware interface signal according to embodiments of the present disclosure, the first determination unit further includes: a first acquisition sub-unit, a first determination sub-unit and a second determination sub-unit. The first acquisition sub-unit is configured to acquire a runtime corresponding to each piece of logical bit information of the multiple pieces of logical bit information; the first determination sub-unit is configured to determine the reload value based on the runtime; and the second determination sub-unit is configured to determine one initial matching value corresponding to the timer based on a logical bit of each piece of logical bit information, to obtain multiple initial matching values corresponding to the timer, wherein the initial matching value corresponding to the each piece of logical bit information is configured to control the duration when the logical bit information is at a high level, to control a logical bit of the logical bit information to be 0 or 1.

In the apparatus for generating the hardware interface signal according to embodiments of the present disclosure, the second generation unit further includes: a first generation sub-unit, configured to sequentially generate a hardware interface sub-signal corresponding to each piece of logical bit information based on a sequence of the multiple pieces of logical bit information corresponding to the request command, the reload value and the initial matching value which corresponds to the each piece of logical bit information, to obtain the hardware interface signal.

In the apparatus for generating the hardware interface signal according to embodiments of the present disclosure, the first generation sub-unit further includes: a decrement sub-module, a first signal output sub-module, a second signal output sub-module and a first determination sub-module. The decrement sub-module is configured to perform a decrement operation on the reload value corresponding to the each piece of logical bit information according to the timer; the first signal output sub-module is configured to output, by the first system, a first signal corresponding to the logical bit information before the reload value corresponding to the each piece of logical bit information is decremented to the initial matching value corresponding to the logical bit information, wherein the first signal is a high-level signal; the second signal output sub-module is configured to output, by the first system, a second signal corresponding to the logical bit information after the reload value corresponding to the each piece of logical bit information is decremented to the initial matching value corresponding to the logical bit information, wherein the second signal is a low-level signal; and the first determination sub-module is configured to determine to generate a hardware interface sub-signal corresponding to the logical bit information, in response to the reload value corresponding to each piece of logical bit information being decremented to 0, to obtain a hardware interface sub-signal corresponding to the each piece of logical bit information, wherein the hardware interface sub-signal corresponding to each piece of logical bit information is formed by the first signal and the second signal which correspond to the logical bit information.

In the apparatus for generating the hardware interface signal according to embodiments of the present disclosure, the apparatus for generating the hardware interface signal further includes: a first interrupt triggering module and a second interrupt triggering module. The first interrupt triggering module is configured to trigger a first interrupt corresponding to the logical bit information in response to the reload value corresponding to each piece of logical bit information being decremented to the initial matching value corresponding to the logical bit information; and the second interrupt triggering module is configured to trigger a second interrupt corresponding to the logical bit information in response to the reload value corresponding to each piece of logical bit information being decremented to 0.

In the apparatus for generating the hardware interface signal according to embodiments of the present disclosure, the apparatus for generating the hardware interface signal further includes: an interrupt count module and a field determination module. The interrupt count module is configured to perform interrupt count once every time one first interrupt or second interrupt is triggered; and the field determination module is configured to determine a field which is currently performing signal conversion processing in the request command according to the interrupt count, wherein the signal conversion processing is configured to generate the hardware interface sub-signal corresponding to logical bit information which corresponds to each field in the request command.

In the apparatus for generating the hardware interface signal according to embodiments of the present disclosure, the field determination module further includes: a second acquisition unit, a second determination unit, a third determination unit, and a fourth determination unit. The second acquisition unit is configured to acquire the number of bytes corresponding to each field in the request command; the second determination unit is configured to determine the number of pieces of logical bit information corresponding to the request command based on the number of bytes, wherein each byte corresponding to the request command corresponds to one piece of logical bit information; the third determination unit is configured to determine the number of interrupts corresponding to the request command based on the number of pieces of logical bit information, wherein the number of interrupts corresponding to the request command is twice the number of pieces of logical bit information; and the fourth determination unit is configured to determine the field which is currently performing signal conversion processing in the request command according to the number of interrupts and the interrupt count.

In the apparatus for generating the hardware interface signal according to embodiments of the present disclosure, the fourth determination unit further includes: a third determination sub-unit, a fourth determination sub-unit and a fifth determination sub-unit. The third determination sub-unit is configured to determine logical bit information which is currently converted into the hardware interface sub-signal based on the number of interrupts and the interrupt count; the fourth determination sub-unit is configured to determine a byte corresponding to the logical bit information which is currently converted into the hardware interface sub-signal as a target byte; and the fifth determination sub-unit is configured to determine that a field corresponding to the target byte is the field which is currently performing signal conversion processing in the request command.

In the apparatus for generating the hardware interface signal according to embodiments of the present disclosure, a data structure of request data corresponding to the request command is a first data structure, wherein the first data structure at least includes a device address, a write length, a read length, a command code and a request parameter; the device address is configured to characterize an address of a target device, the target device is a device generating response data according to the hardware interface signal, the command code is configured to distinguish different request commands, the write length is configured to characterize the number of bytes from the start of the command code to the end of the request data, the read length is configured to characterize the number of bytes containing a completion code and read data in the request data, and the request parameter is configured to characterize a parameter of the request command.

In the apparatus for generating the hardware interface signal according to embodiments of the present disclosure, the acquisition module further includes: a request data acquisition unit and a request data parsing unit. The request data acquisition unit is configured to acquire the request data in response to the first system detects a first request triggered by the second system, wherein the first system and the second system run on the same processor, the request data is generated by the second system, and a service response speed of the second system is less than a service response speed of the first system; and the request data parsing unit is configured to parse the request data, to obtain the request command.

In the apparatus for generating the hardware interface signal according to embodiments of the present disclosure, the apparatus for generating the hardware interface signal further includes: a request data storage module is configured to store, by the second system, the request data in a target memory, and after the request data is stored, trigger, by the second system, the first request, wherein the first request is configured to notify the first system of reading the request data from the target memory, and the target memory is a memory that can be accessed by both the first system and the second system.

In the apparatus for generating the hardware interface signal according to embodiments of the present disclosure, the apparatus for generating the hardware interface signal includes: a voltage conversion module is configured to convert a voltage of the hardware interface signal, to obtain a target hardware interface signal.

In the apparatus for generating the hardware interface signal according to embodiments of the present disclosure, the voltage conversion module further includes: a signal input unit is configured to input the hardware interface signal into a voltage conversion device, to obtain the target hardware interface signal outputted by the voltage conversion device.

In the apparatus for generating the hardware interface signal according to embodiments of the present disclosure, the apparatus for generating the hardware interface signal further includes: a response data receiving module and a data structure adjustment module. The response data receiving module is configured to receive, by the first system, response data corresponding to the hardware interface signal, wherein a transmission form of the response data is the same as a transmission form of the hardware interface signal; and the data structure adjustment module is configured to adjust a data structure of the response data to a second data structure.

In the apparatus for generating the hardware interface signal according to embodiments of the present disclosure, the second data structure at least includes: a first check value, a second check value and response validity data, wherein the first check value is configured to characterize a check value in the request data, the second check value is configured to characterize a check value in the response data, the response validity data is configured to characterize a completion code in the response data and data for describing a state of the target device, and the target device is a device generating the response data according to the hardware interface signal.

In the apparatus for generating the hardware interface signal according to embodiments of the present disclosure, the apparatus for generating the hardware interface signal further includes: a second request triggering module is configured to trigger, by the first system, a second request, wherein the second request is configured tor notify the second system of reading the response data.

In the apparatus for generating the hardware interface signal according to embodiments of the present disclosure, the hardware interface signal is any one signal of the PECI signal, the HDMI signal, the SGMII signal, an RGMII signal, a GPIO signal, and an SPI signal.

Embodiments of the present disclosure further provide a computer-readable storage medium. Optionally, in this embodiment, the storage medium can be configured to store program codes executed by the method for generating a hardware interface signal provided as above.

Optionally, in this embodiment, the storage medium can be located in any computer terminal in a computer terminal group in a computer network, or located in any mobile terminal in the mobile terminal group.

Embodiments of the present disclosure further provide an electronic device, comprising a memory and a processor; wherein the memory stores a computer program, and the processor is configured to run the computer program to execute the method for generating a hardware interface signal provided as above.

Embodiments of the present disclosure can provide a computer terminal; the computer terminal can be any computer terminal device in a computer terminal group. Optionally, in this embodiment, the computer terminal may also be replaced by a terminal device such as a mobile terminal.

Optionally, in this embodiment, the computer terminal may be located in at least one network device among a plurality of network devices in a computer network.

In this embodiment, the computer terminal may execute program codes of the following steps in the method for generating the hardware interface signal: acquiring, by a first system, a request command; determining multiple pieces of logical bit information corresponding to the request command; and generating a hardware interface signal corresponding to the request command based on the multiple pieces of logical bit information and a timer.

The computer terminal can execute program codes of the following steps in the method for generating a hardware interface signal: determining a reload value and an initial matching value which correspond to the timer according to the multiple pieces of logical bit information; and generating a hardware interface signal corresponding to the request command based on the reload value and the initial matching value.

The computer terminal can execute program codes of the following steps in the method for generating the hardware interface signal: acquiring a runtime corresponding to each piece of logical bit information of the multiple pieces of logical bit information; determining the reload value according to the runtime; and determining one initial matching value corresponding to the timer according to a logical bit of each piece of logical bit information, to obtain multiple initial matching values corresponding to the timer, wherein the initial matching value corresponding to each piece of logical bit information is configured to control the duration when the logical bit information is at a high level, so as to control a logical bit of the logical bit information to be 0 or 1.

The computer terminal can execute program codes of the following steps in the method for generating the hardware interface signal: based on a sequence of the multiple pieces of logical bit information corresponding to the request command, the reload value and the initial matching value which corresponds to each piece of logical bit information, sequentially generating a hardware interface sub-signal corresponding to the each piece of logical bit information, to obtain the hardware interface signal.

The computer terminal can execute program codes of the following steps in the method for generating the hardware interface signal: performing a decrement operation on the reload value corresponding to the each piece of logical bit information based on the timer; before the reload value corresponding to the each piece of logical bit information is decremented to the initial matching value corresponding to the logical bit information, outputting, by the first system, a first signal corresponding to the logical bit information, wherein the first signal is a high-level signal; after the reload value corresponding to each piece of logical bit information is decremented to the initial matching value corresponding to the logical bit information, outputting, by the first system, a second signal corresponding to the logical bit information, wherein the second signal is a low-level signal; and in response to the reload value corresponding to each piece of logical bit information being decremented to 0, determining to generate the hardware interface sub-signal corresponding to the logical bit information, to obtain a hardware interface sub-signal corresponding to each piece of logical bit information, wherein the hardware interface sub-signal corresponding to each piece of logical bit information is formed by the first signal and the second signal which correspond to the logical bit information.

The computer terminal can execute program codes of the following steps in the method for generating the hardware interface signal: in response to the reload value corresponding to each piece of logical bit information being decremented to the initial matching value corresponding to the logical bit information, triggering a first interrupt corresponding to the logical bit information; and in response to the reload value corresponding to each piece of logical bit information being decremented to 0, triggering a second interrupt corresponding to the logical bit information.

The computer terminal can execute program codes of the following steps in the method for generating the hardware interface signal: in the process of sequentially generating a hardware interface sub-signal corresponding to each piece of logical bit information based on the reload value and the initial matching value which corresponds to the each piece of logical bit information, performing interrupt count once every time one first interrupt or second interrupt is triggered; and determining a field which is currently performing signal conversion processing in the request command based on the interrupt count, wherein the signal conversion processing is configured to generate the hardware interface sub-signal corresponding to logical bit information which corresponds to each field in the request command.

The computer terminal can execute program codes of the following steps in the method for generating the hardware interface signal: acquiring the number of bytes corresponding to each field in the request command; determining the number of pieces of logical bit information corresponding to the request command based on the number of bytes, wherein each byte corresponding to the request command corresponds to one piece of logical bit information; determining the number of interrupts corresponding to the request command based on the number of pieces of logical bit information, wherein the number of interrupts corresponding to the request command is twice the number of pieces of logical bit information; and determining the field which is currently performing signal conversion processing in the request command based on the number of interrupts and the interrupt count.

The computer terminal can execute program codes of the following steps in the method for generating the hardware interface signal: determining logical bit information which is currently converted into the hardware interface sub-signal based on the number of interrupts and the interrupt count; determining a byte corresponding to the logical bit information which is currently converted into the hardware interface sub-signal as a target byte; and determining that a field corresponding to the target byte is the field which is currently performing signal conversion processing in the request command.

In addition, a data structure of request data corresponding to the request command is a first data structure, wherein the first data structure at least comprises a device address, a write length, a read length, a command code and a request parameter; the device address is configured to characterize an address of a target device, the target device is a device generating response data based on the hardware interface signal, the command code is configured to distinguish different request commands, the write length is configured to characterize the number of bytes from the start of the command code to the end of the request data, the read length is configured to characterize the number of bytes containing a completion code and read data in the request data, and the request parameter is based on characterize a parameter of the request command.

The computer terminal can execute program codes of the following steps in the method for generating the hardware interface signal: acquiring the request data in response to the first system detects a first request triggered by the second system, wherein the first system and the second system run on the same processor, the request data is generated by the second system, and a service response speed of the second system is less than a service response speed of the first system; and parsing the request data, to obtain the request command.

The computer terminal can execute program codes of the following steps in the method for generating the hardware interface signal: before the request data, storing is acquired, by the second system, the request data in a target memory, and after the request data is stored, triggering, by the second system, the first request, wherein the first request is configured to notify the first system of reading the request data from the target memory, and the target memory is a memory that can be accessed by both the first system and the second system.

The computer terminal can execute program codes of the following steps in the method for generating the hardware interface signal: after the hardware interface signal corresponding to the request command is generated based on the logical bit information and the timer, converting a voltage of the hardware interface signal, to obtain a target hardware interface signal.

The computer terminal can execute program codes of the following steps in the method for generating the hardware interface signal: inputting the hardware interface signal into a voltage conversion device, to obtain the target hardware interface signal outputted by the voltage conversion device.

The computer terminal can execute program codes of the following steps in the method for generating the hardware interface signal: after generating the hardware interface signal corresponding to the request command according to the logical bit information and the timer, receiving, by the first system, response data corresponding to the hardware interface signal, wherein a transmission form of the response data is the same as a transmission form of the hardware interface signal; and adjusting a data structure of the response data to a second data structure.

Optionally, the second data structure at least includes: a first check value, a second check value and response validity data, wherein the first check value is configured to characterize a check value in the request data, the second check value is configured to characterize a check value in the response data, the response validity data is configured to characterize a completion code in the response data and data for describing a state of the target device, and the target device is a device generating the response data according to the hardware interface signal.

The computer terminal can execute program codes of the following steps in the method for generating the hardware interface signal: after the data structure of the response data is adjusted to the second data structure, triggering, by the first system, a second request, wherein the second request is used for notifying the second system of reading the response data.

In addition, the hardware interface signal is any one signal of the PECI signal, the HDMI signal, the SGMII signal, the RGMII signal, the GPIO signal, and the SPI signal.

Figure 14:
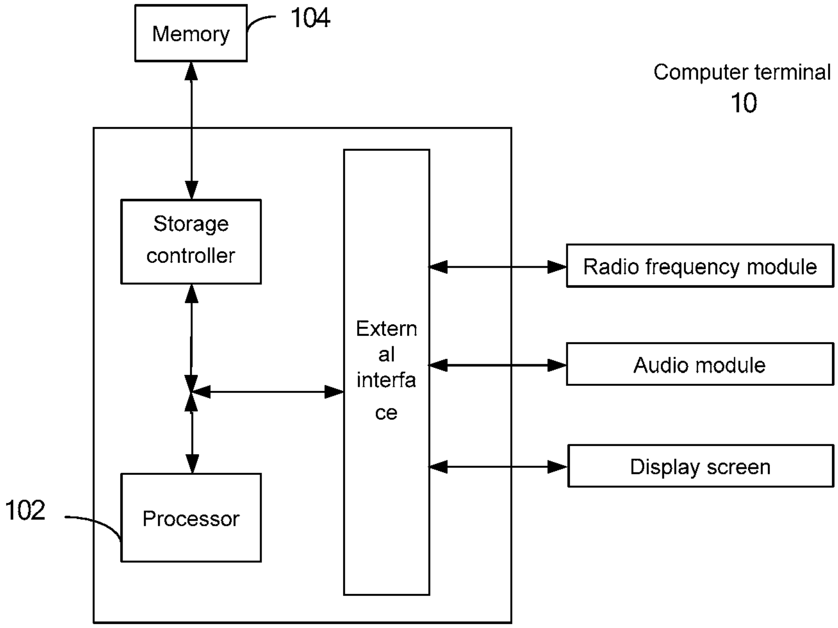
FIG. 14 is a structural block diagram of a computer terminal according to embodiments of the present disclosure.

FIG. 14 is a structural block diagram of a computer terminal according to embodiments of the present disclosure. As shown in FIG. 14, the computer terminal 10 can include at least one (only one is shown in FIG. 14) processor 102 and a memory 104. The computer terminal 10 can further include a storage controller, which controls and manages the memory 104; the computer terminal 10 can further include a peripheral interface, through which a radio frequency module, an audio module, a display screen, and the like are connected.

The memory can be configured to store software programs and modules, such as program instructions/modules corresponding to the method and apparatus for generating the hardware interface signal in the embodiments of the present disclosure; and the processors run the software programs and modules stored in the memory, to execute various functional applications and data processing, i.e. implementing the described method for generating the hardware interface signal. The memory can include a high-speed random access memory, and can also include a non-transitory memory, such as at least one magnetic storage apparatus, flash memories or other non-transitory solid-state memories. In some examples, the memory can further include memories remotely arranged with respect to the processors, and these remote memories can be connected to the computer terminal 10 via a network. Examples of the network include but are not limited to the Internet, an intranet, a local area network, a mobile communication network and a combination thereof.

The processor can call information and application programs stored in the memory via a transmission apparatus, to execute the following steps: detecting, by a first system in a first processor kernel, whether a serial port switching instruction is received, wherein the serial port switching instruction carries information of a target serial port to be switched to; in response to the serial port switching instruction being received, sending, by the first system, the serial port switching instruction to a second system in a second processor kernel, wherein a service response speed of the second system is less than a service response speed of the first system; and executing serial port switching by the second system according to the serial port switching instruction.

A person of ordinary skill in the art would understand that the structure as shown in FIG. 14 is exemplary. The computer terminal can also be a terminal device such as a smartphone (for example, an Android mobile phone, an iOS mobile phone, etc.), a tablet computer, a palmtop computer, Mobile Internet Devices (MIDs for short), and a PAD. FIG. 14 does not limit the structure of the electronic apparatus. For example, the computer terminal 10 may also include more or fewer assemblies (such as a network interface, a display apparatus, etc.) than those shown in FIG. 14, or have different configurations from that shown in FIG. 14.

Figure 15:
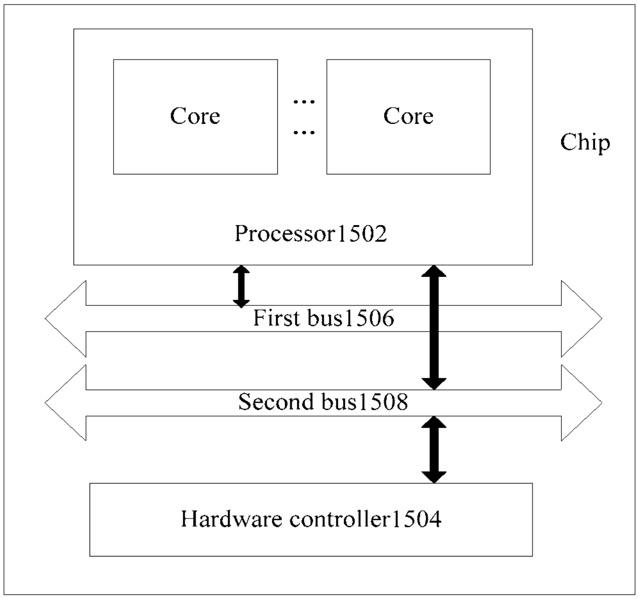
FIG. 15 is a structural block diagram of an embedded system according to embodiments of the present disclosure.

Embodiments of the present disclosure further provide an embedded system. As shown in FIG. 15, the embedded system can include: a chip and at least two operating systems, wherein the chip includes a processor 1502, a hardware controller 1504, a first bus 1506 and a second bus 1508, wherein the bandwidth of the first bus 1506 is higher than the bandwidth of the second bus 1508, the first bus 1506 is configured to be in a multi-master multi-slave mode, and the second bus 1508 is configured to be in a one-master multi-slave mode; the at least two operating systems run based on the processor 1502; the at least two operating systems communicate via the first bus 1506; and the at least two operating systems control the hardware controller by the second bus 1508.

The chip can be the BMC chip; the processor can be a multi-core processor, and the hardware controller can be configured to control an external device connected to a corresponding external interface; the first bus is configured in a multi-master multi-slave mode, and can be a bus used for communication between a plurality of processor cores of the processor, such as an Advanced High Performance Bus (AHB); and the second bus is configured in a one-master multi-slave mode, and can be a bus used for control by the processor on the hardware controller, such as an Advanced Peripheral Bus (APB); and the bandwidth of the first bus is higher than the bandwidth of the second bus.

The embedded system can include at least two operating systems, wherein the at least two operating systems run based on the processor, and processing resources of the processor are dynamically allocated to the at least two operating systems; the processing resources of the processor include processor cores; the at least two operating systems communicate via the first bus, and the at least two operating systems control the hardware controller via the second bus.

Optionally, the hardware controller can include at least one controller, and can include but not limited to a controller corresponding to at least one of the following chip peripherals: Inter-Integrated Circuit (I2C), Universal Serial Bus (USB), Universal Asynchronous Receiver/Transmitter (UART), Analog to Digital Converter (ADC), Joint Test Action Group (JTAG), Real_Time Clock (RTC), General Purpose Input/Output (GPIO), Watch Dog Timer (WDT), Virtual UART, Super I/O, Serial General Purpose Input/Output (SGPIO), Pulse Width Modulation, FanTach (fan speed regulation), Timer (clock), Platform Environment Control Interface (PECI), MailBox, and other types of controllers may also be included. The external interface can include at least one external interface, and can include but not limited to external interfaces corresponding to any one of the controllers above.

It is mentioned above that the first bus is configured in a multi-master multi-slave mode, and can be a bus used for communication between a plurality of processor cores of the processor, such as an Advanced High Performance Bus (AHB); and the second bus is configured in a one-master multi-slave mode, and can be a bus used for control by the processor on the hardware controller, such as an Advanced Peripheral Bus (APB); and the bandwidth of the first bus is higher than the bandwidth of the second bus. This will be expanded for description below. The first bus has been defined in AMBA2. The first bus is primarily used as a high-speed bus of the system at the beginning, is applicable to a high-performance and low-power-consumption system design, and is mainly used for connection between high-performance modules (such as a CPU, a Direct Memory Access, DMA, and a Digita Signal Processing, DSP), and is used as an on-chip system bus of an System on Chip, (SoC). In an Advanced Microcontroller Bus Architecture (AMBA) protocol, the AHB is mainly oriented to a system-level high-bandwidth and high-performance system interconnection design, and includes the following characteristics: single clock edge operation; non-tristate implementation; supporting burst transmission; supporting segmented transmission; supporting a multi-master multi-slave interconnection mode; being capable of configuring a bus width of 32-128 bits; and supporting transmission of bytes, half-bytes, and words. An AHB system consists of 3 parts, i.e. a master module, a slave module, and an Infrastructure; transmission on the entire first bus is initiated by the master module, and the slave module is responsible for responding. The infrastructure comprises an arbiter, a multiplexer from the master module to the slave module, a multiplexer from the slave module to the master module, a decoder, a dummy slave module and a dummy master module.

The APB is mainly used for connection between low-bandwidth peripherals, such as UART, 1284, etc.; and a bus architecture thereof does not support multiple master modules as the AHB, and the only master module in the APB is an APB bridge. The features thereof include:

(1) being able to operate at a high frequency;

(2) simple protocol: no complex timing;

(3) synchronous bus: all transactions (read/write operations) on the bus depend on a rising edge of a clock;

(4) one-master multi-slave: in general, the APB is hung under a first bus system, and the transactions are converted between the first bus system via an AHB-APB Bridge, and at this moment, the Bridge is a master of the APB, and other peripheral devices are all slaves;

(5) simple interface: relative to Advanced extensible Interface (AXI) and AHB, the interface is simple;

(6) low power consumption;

(7) being capable of connecting various peripheral devices: I2C, SPI, Timer, Keypad, UART.

In some optional embodiments, in the multi-master multi-slave mode of the AHB, the Master first sends a packet sending request to the arbiter, the arbiter determines permission appropriate for the master to acquire a bus access, the master sends data and a control signal to the arbiter after acquiring the permission, and the arbiter determines a corresponding slave path by address resolution, and then sends the request to a corresponding destination end. Likewise, response data will be parsed by the Decoder and then returned to a corresponding master. Many-to-many access is achieved by such a multiplexing mechanism.

In some optional embodiments, in one-master multi-slave mode of the APB, the APB is usually hung under the first bus system, and the transactions are converted between the first bus system via an AHB-APB Bridge, and at this moment, the Bridge is a master of the APB, and other peripheral devices are all slaves. A data request can only be sent by the Master to a slave, and the slave returns corresponding response data to the master after receiving the request. This process can achieve one-to-many access, and the access does not involve arbitration and Decoder parsing operations in the first bus.

In addition, the first bus also has a high bandwidth characteristic and is used for interconnection between high-performance modules (CPU, DMA, etc.) in the system; and the APB bus has a low bandwidth and is used for connection between peripherals (UART, I2C, etc.) in the system. A logical circuit and a bus protocol of the first bus are complex, and an interface circuit and a bus protocol of the APB bus are relatively simple.

Optionally, regarding CPU resource occupation situations in response to the RTOS wakes up from sleeping, the RTOS completely does not occupy CPU core resources after being in dormant, and when it is woken up (for example, a peripheral or a wake-up timer generates an interrupt to trigger a wake-up action), a control right of core 0 is acquired again by inter-core interrupt. In the process from a dormant state to re-acquiring of core control right, the RTOS system does not require participation of the core.

In this embodiment, the provided embedded system can be used to generate a hardware interface signal. The two operating systems included in the embedded system can be the first system and the second system. In this embodiment, the first system is configured to acquire a request command; determine multiple pieces of logical bit information corresponding to the request command; and generate a hardware interface signal corresponding to the request command based on the multiple pieces of logical bit information and a timer.

Optionally, the first system is configured to determine a reload value and an initial matching value which correspond to the timer based on the multiple pieces of logical bit information; and the first system is configured to generate a hardware interface signal corresponding to the request command based on the reload value and the initial matching value.

Optionally, the first system is configured to acquire a runtime corresponding to each piece of logical bit information of the multiple pieces of logical bit information; the first system is configured to determine the reload value based on the runtime; and the first system is configured to determine one initial matching value corresponding to the timer based on a logical bit of each piece of logical bit information, to obtain multiple initial matching values corresponding to the timer, wherein the initial matching value corresponding to each piece of logical bit information is configured to control the duration when the logical bit information is at a high level, so as to control a logical bit of the logical bit information to be 0 or 1.

Optionally, the first system is configured to sequentially generate a hardware interface sub-signal corresponding to each piece of logical bit information based on a sequence of the multiple pieces of logical bit information corresponding to the request command, the reload value and the initial matching value which corresponds to the each piece of logical bit information, to obtain the hardware interface signal.

Optionally, the first system is configured to perform a decrement operation on the reload value corresponding to each piece of logical bit information based on the timer; the first system is configured to output, by the first system, a first signal corresponding to the logical bit information before the reload value corresponding to each piece of logical bit information is decremented to the initial matching value corresponding to the logical bit information; wherein the first signal is a high-level signal; the first system is configured to output, by the first system, a second signal corresponding to the logical bit information after the reload value corresponding to each piece of logical bit information is decremented to the initial matching value corresponding to the logical bit information; wherein the second signal is a low-level signal; and the first system is configured to determine to generate a hardware interface sub-signal corresponding to the logical bit information in response to the reload value corresponding to each piece of logical bit information is decremented to 0, to obtain a hardware interface sub-signal corresponding to the each piece of logical bit information, wherein the hardware interface sub-signal corresponding to the each piece of logical bit information is formed by the first signal and the second signal which correspond to the logical bit information.

Optionally, the first system is configured to trigger a first interrupt corresponding to the logical bit information in response to the reload value corresponding to each piece of logical bit information being decremented to the initial matching value corresponding to the logical bit information; and the first system is configured to trigger a second interrupt corresponding to the logical bit information in response to the reload value corresponding to the each piece of logical bit information being decremented to 0.

Optionally, the first system is configured to perform interrupt count once every time one first interrupt or second interrupt is triggered; and the first system is configured to determine a field which is currently performing signal conversion processing in the request command based on the interrupt count, wherein the signal conversion processing is configured to generate the hardware interface sub-signal corresponding to logical bit information which corresponds to each field in the request command.

Optionally, the first system is configured to acquire the number of bytes corresponding to each field in the request command; the first system is configured to determine the number of pieces of logical bit information corresponding to the request command based on the number of bytes, wherein each byte corresponding to the request command corresponds to one piece of logical bit information; the first system is configured to determine the number of interrupts corresponding to the request command based on the number of pieces of logical bit information, wherein the number of interrupts corresponding to the request command is twice the number of pieces of logical bit information; and the first system is configured to determine the field which is currently performing signal conversion processing in the request command based on the number of interrupts and the interrupt count.

Optionally, the first system is configured to determine logical bit information which is currently converted into the hardware interface sub-signal based on the number of interrupts and the interrupt count; the first system is configured to determine a byte corresponding to the logical bit information which is currently converted into the hardware interface sub-signal as a target byte; and the first system is configured to determine that a field corresponding to the target byte is the field which is currently performing signal conversion processing in the request command.

Optionally, a data structure of request data corresponding to the request command is a first data structure, wherein the first data structure at least comprises a device address, a write length, a read length, a command code and a request parameter; the device address is configured to characterize an address of a target device, the target device is a device generating response data according to the hardware interface signal, the command code is configured to distinguish different request commands, the write length is configured to characterize the number of bytes from the start of the command code to the end of the request data, the read length is configured to characterize the number of bytes containing a completion code and read data in the request data, and the request parameter is configured to characterize a parameter of the request command.

Optionally, the embedded system further comprises a second system, wherein the second system and the first system both run on the processor, and the second system is configured to generate request data; the first system is configured to acquire the request data in response to detect a first request triggered by the second system, wherein a service response speed of the second system is less than a service response speed of the first system; and the first system is configured to parse the request data, to obtain the request command.

Optionally, the second system is configured to store the request data in a target memory, and after the request data is completely stored, trigger the first request, wherein the first request is configured to notify the first system of reading the request data from the target memory, and the target memory is a memory that can be accessed by both the first system and the second system.

Optionally, the first system is configured to convert a voltage of the hardware interface signal, to obtain a target hardware interface signal.

Optionally, the first system is configured to input the hardware interface signal into a voltage conversion device, to obtain the target hardware interface signal outputted by the voltage conversion device.

Optionally, the first system is configured to receive response data corresponding to the hardware interface signal, wherein a transmission form of the response data is the same as a transmission form of the hardware interface signal; and the second system is configured to adjust a data structure of the response data to a second data structure.

Optionally, the second data structure at least comprises: a first check value, a second check value and response validity data, wherein the first check value is configured to characterize a check value in the request data, the second check value is configured to characterize a check value in the response data, the response validity data is configured to characterize a completion code in the response data and data for describing a state of the target device, and the target device is a device generating the response data according to the hardware interface signal.

Optionally, the first system is configured to triggering a second request, wherein the second request is configured to notify the second system of reading the response data.

Optionally, the hardware interface signal is any one signal of a PECI signal, an HDMI signal, an SGMII signal, an RGMII signal, a GPIO signal, and an SPI signal.

Figure 16:
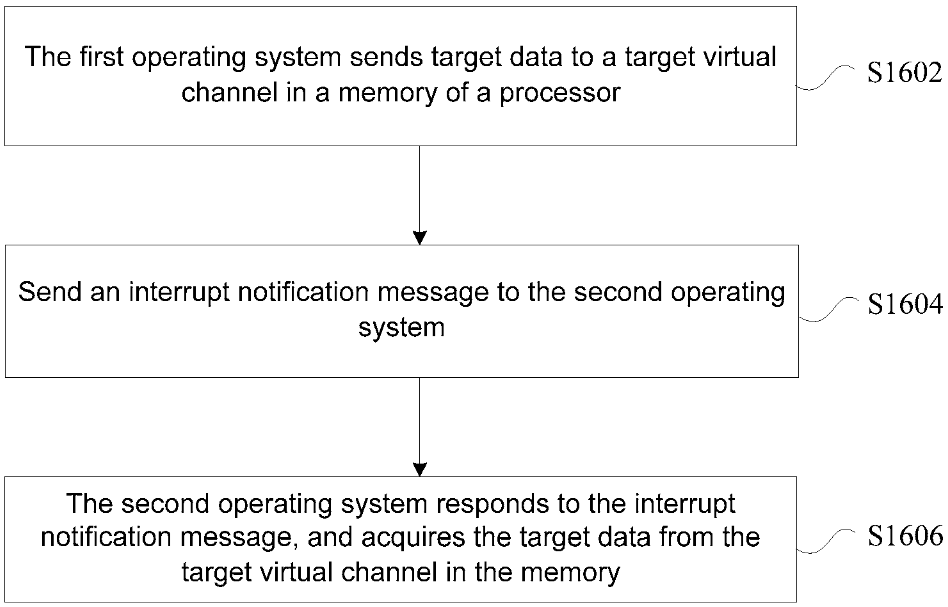
FIG. 16 is a flowchart of a communication method according to embodiments of the present disclosure.

In some optional embodiments, the first system and the second system can respectively run in different processor cores of a processor, and therefore communication between the first system and the second system is an inter-core communication method. As shown in FIG. 16, an inter-core communication method is provided. The method is implemented by the embedded system of the described embodiments, wherein the first operating system in FIG. 16 may correspond to the described first system, and the second operating system may correspond to the described second system, and the method comprises the following steps:

at step S1602, the first operating system sends target data to a target virtual channel in a memory of a processor, wherein the first operating system and the second operating system run on the processor.

The first operating system and the second operating system can be real-time operating systems, and also can be non-real-time operating systems; the first operating system and the second operating system may be single-core operating systems and can also be multi-core operating systems; the target data is data to be sent, the target virtual channel is a segment of free storage space in the memory; and the first operating system sends the target data to the target virtual channel in the memory of the processor means that a CPU core of the first operating system writes the data to be sent into the target virtual channel.

At step S1604, an interrupt notification message is sent to the second operating system.

In an embodiment, the CPU core of the first operating system sends the interrupt notification message to the CPU core of the second operating system, wherein the interrupt notification message can carry an address of the target virtual channel, for notifying the second operating system of acquiring the target data from the target virtual channel, and the interrupt notification message can be triggered by software and may also be triggered by hardware.

At step S1606, the second operating system responds to the interrupt notification message, and acquires the target data from the target virtual channel in the memory.

In an embodiment, the CPU core of the second operating system responds to the interrupt notification message, parses the address of the target virtual channel from the interrupt notification message, then locates to the target virtual channel in the memory based on the parsed address, and acquires the target data from the target virtual channel, thereby realizing data interaction between the first operating system and the second operating system.

By the steps S1602 to S1606, when the plurality of operating systems running on the processor need to transmit data to each other, the first operating system sending data sends the target data to the target virtual channel in the memory of the processor, and sends the interrupt notification message to the second operating system, and the second operating system receiving the data responds to the interrupt notification message and acquires the target data from the target virtual channel, thereby solving the problems of resource waste and a strong dependency on operating systems in an inter-core communication process, and achieving the effects of reducing the waste of resources and the dependency on the operating systems in the inter-core communication process.

Figure 17:
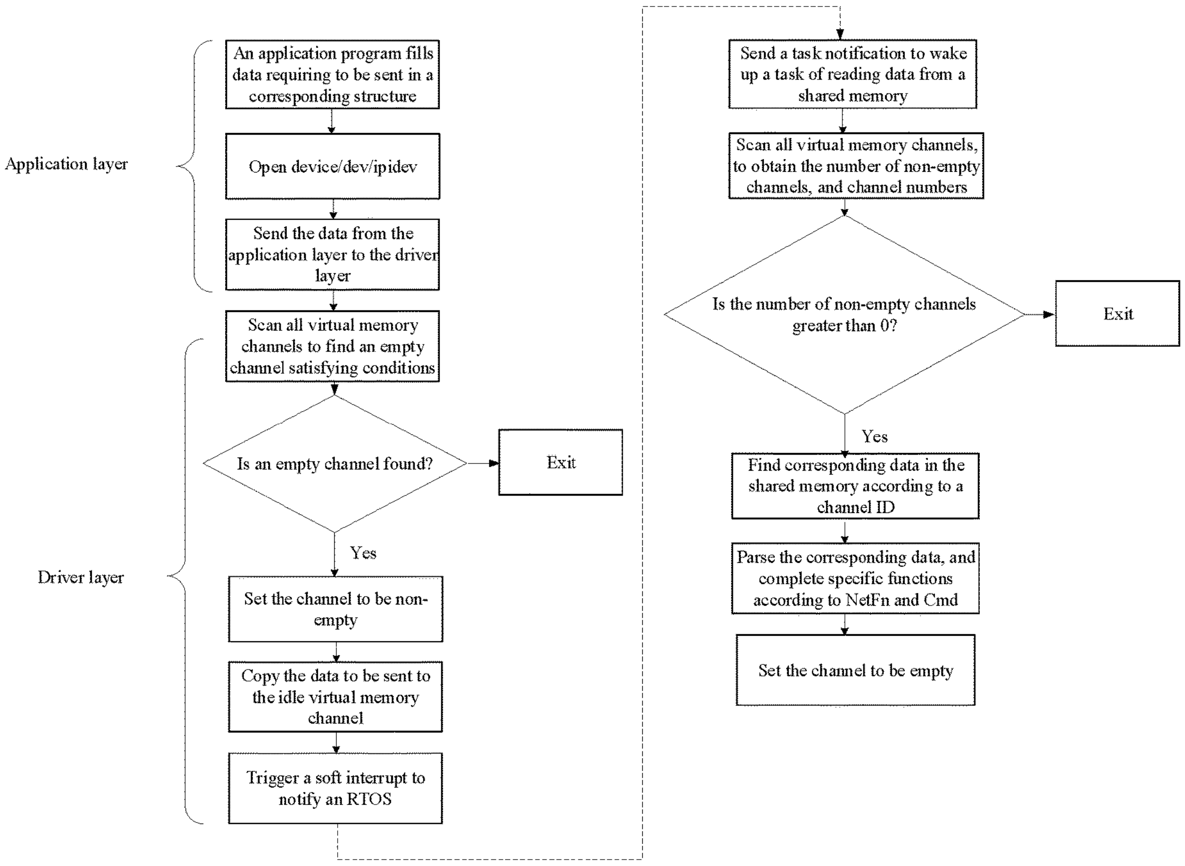
FIG. 17 is a flowchart I of an optional communication method according to embodiments of the present disclosure.

In addition, FIG. 17 is a flowchart I of an optional communication method according to embodiments of the present disclosure. As shown in FIG. 17, it is a process in which a non-real time operating system sends data to the real-time operating system.

First, an application layer of the non-real-time operating system fills, according to a corresponding format, data requiring to be sent; then, a device file ipidev is generated on/dev path of the system; when the application layer needs to read/write data from a driver layer, device/dev/ipidev can be opened first through using an open function carried by the system itself, the data requiring to be sent is sent from the application layer of the non-real-time operating system to the driver layer through using a write function; and the driver layer of the non-real-time operating system puts the data in a shared memory, and then triggers a soft interrupt to notify a real-time operating system of another core to read the data.

In an embodiment, the shared memory area is divided into a plurality of memory channels, each memory channel corresponds to a channel structure (IpiHeader), and structure data is configured to record relevant information of the memory channels. The driver layer of the non-real-time operating system first uses an interface GetEmptyChannel to search, according to the size of the data to be sent, all channels for memory channels satisfying the following two conditions: one condition is that an idle Flag in the channel structure IpiHeader is not equal to 0xA5A5A5A5; and the other condition is that the size of the channel ChannelSize in the channel structure IpiHeader is larger than the size of the data to be sent, and after an idle channel satisfying requirements is found, the channel is set to be non-empty, that is, the idle Flag in the channel structure IpiHeader is set to 0xA5A5A5A5, then the data to be sent is copied to the idle channel, and then a soft interrupt is triggered to notify the real-time operating system of another core.

In some embodiments, the real-time operating system receives an interrupt and triggers a corresponding interrupt processing function; the interrupt processing function sends a task notification to wake up a corresponding task, and the task reads the data from the shared memory and parses same. In an embodiment, the task first uses an interface GetNoEmptyChannel to search all channels for channels satisfying the following three conditions: a first condition is that an idle Flag in the channel structure IpiHeader is equal to 0xA5A5A5A5; a second condition is that TargetId in the channel structure is equal to an ID of the current CPU; and a third condition is that TargetId in the channel structure is not equal to SrcId. After a non-idle channel meeting the requirements is found, data of the non-idle channel is parsed, some functions are completed according to NetFn and Cmd in the channel structure IpiHeader, and finally the channel is set to be empty, that is, the idle Flag in the channel structure is set to be 0.

Figure 18:
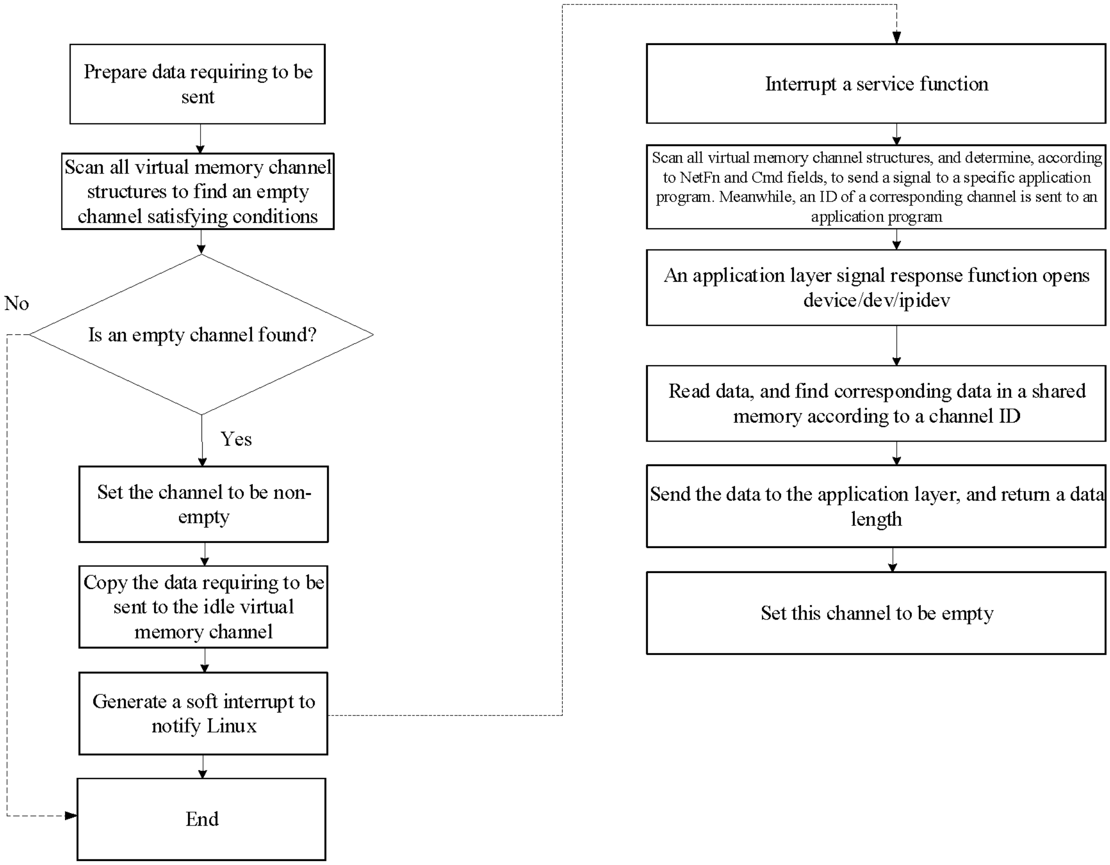
FIG. 18 is a flowchart II of an optional communication method according to embodiments of the present disclosure.

FIG. 18 is a flowchart II of an optional communication method according to embodiments of the present disclosure. As shown in FIG. 18, it is a process in which the real time operating system sends data to the non-real-time operating system.

First, in response to there being data requiring to be sent at the real-time operating system side, an idle channel is found from a shared sub-memory; in response to an idle channel being found, the channel is set to be empty, and the data requiring to be sent is copied to the found idle channel; then a soft interrupt is generated to notify the non-real-time operating system side; the non-real-time operating system side calls a corresponding interrupt processing function; the interrupt processing function scans structures IpiHeader of all channels; according to NetFn and Cmd fields in the structure, it is determined a signal is sent to which application layer program, and at the same time, a corresponding channel ID is sent to an application program. It should be noted that, in response to a system being initialized, the application layer program of inter-core communication needs to register NetFn and Cmd and a PID corresponding to the application layer program to a driver program; the application layer calls a corresponding processing function after a signal is received, opens device/dev/ipidev to read data, the driver program finds corresponding data in the shared memory according to a channel ID, returns the data and data length to the application layer, and sets the channel to be empty, i.e. sets an idle Flag in a channel structure to be 0.

Some embodiments of the present disclosure provide a method for inter-core communication in a multi-core multi-operating system of the present embodiment. A physical layer performs data exchange through using a shared memory manner, and a virtual channel is added simultaneously to manage the shared memory. In response to a CPU core of a sender puts data to be sent in the shared memory according to an agreed protocol format, a soft interrupt will be triggered to notify a CPU core of a receiver to read the data, and then the data is parsed according to the agreed protocol format; and after the data is read, it is supported that the CPU core of the sender selects to reply a response to the CPU core of the sender or not to reply. The inter-core communication uses shared memory and soft interrupt manners to implement inter-core communication of the multi-core multi-operating system, and adopts a method for managing the shared memory by using a virtual channel, and a format of a virtual channel structure. No additional assembly is used, the use and development are simple, system resources are saved; meanwhile, only common functions, such as an operating system task and a signal amount, etc. are used, thereby greatly weakening the dependency of the operating systems.

From the description of the embodiments above, a person skilled in the art would have been able to clearly understand that the method in the embodiments above may be implemented by using software and necessary general hardware platforms, and of course can also be implemented using hardware, but in many cases, the former is a better embodiment. On the basis of such understanding, the portion of the technical solutions of some embodiments of the present disclosure that contributes in essence or contributes to the related art may be embodied in the form of a software product. The computer software product is stored in a storage medium (such as an ROM/RAM, a magnetic disk and an optical disc), and includes several instructions for enabling a terminal device (which may be a mobile phone, a computer, a server, or a network device, etc.) to execute the methods as described in various embodiments of the present disclosure.

In order to achieve the object above, based on another aspect of some embodiments of the present disclosure, the chip is also provided, wherein the chip includes at least one of a programmable logic circuit and executable instructions, and the chip runs in an electronic device and is used for implementing the steps in any one of the method embodiments above.

Embodiments of the present disclosure further provide the BMC chip; the BMC chip can include: a storage unit and a processing unit connected to the storage unit. The storage unit is configured to store a program, and the processing unit is configured to run the program to execute the steps in any one of the method embodiments above.

Figure 19:
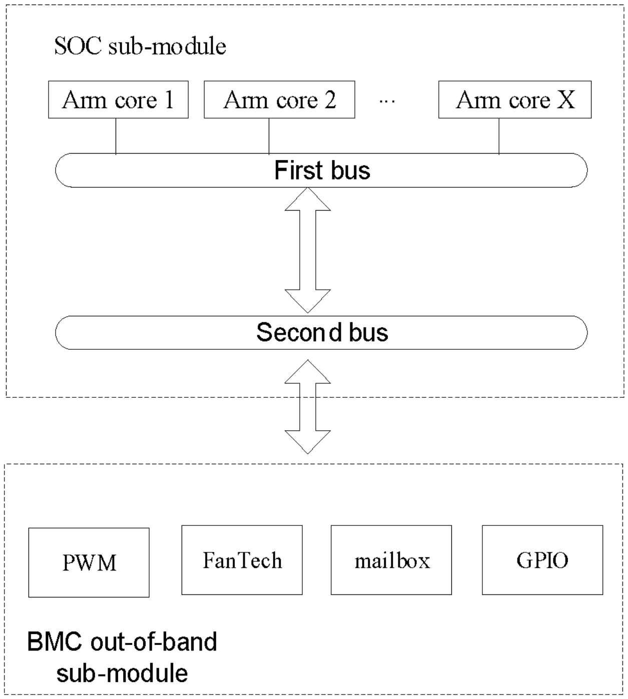
FIG. 19 is a structural block diagram of an optional BMC chip according to embodiments of the present disclosure.

For example, an example of the BMC chip may be as shown in FIG. 19. Hardware of the BMC chip can include but is not limited to, an SOC sub-module and a BMC out-of-band sub-module, wherein the SOC sub-module mainly includes an ARM core (ARM Core 1, ARM Core 2, . . . , ARM Core X), and may further comprise, but is not limited to, a Double Data Rate (DDR) 4 controller (memory controller), an Media Access Control Address (MAC) controller (network controller), an Secure Digital (SD) Card/Embedded Multi Media Card (eMMC) controller (memory controller), a Peripheral Component Interconnect express (PCIe) Root Complex (RC) controller, an Static Random-Access Memory (SRAM), and an SPI controller.

The cores and controllers are interconnected by the first bus to implement interaction between the cores and the controllers. Moreover, the ARM cores are connected to the first bus (for example, may be connected by an Advanced extensible Interface (AXI) Bridge), and communication between the cores is implemented by the first bus. In addition, the SOC sub-module further implements interconnection and intercommunication between the first bus and the second bus (for example, implementing by conversion of an APB Bridge), thereby providing one physical path for the SOC sub-module to access peripherals on the second bus.

The DDR4 controller can be connected to other components or devices by a DDR4 PHY (Physical Layer) interface; the MAC controller is connected to other components or devices by an RGMII (Reduced Gigabit Media Independent Interface); the SD card/eMMC controller is connected to other components or devices by an SD interface; and the PCIe RC controller is connected to other components or devices by a PCIe PHY interface.

The BMC out-of-band sub-module mainly includes controllers corresponding to chip peripherals such as PWM, GPIO, fan speed regulation (FanTech) and mailbox; and by these controllers, out-of-band management functions such as PECI communication (for example, using GPIO to simulate PECI) and fan adjustment and control for the BMC can be implemented. It can be determined from FIG. 19 that the BMC out-of-band sub-module may but is not limited to implement interaction with the SOC sub-module by the second bus.

The BMC chip implements interconnection between on-chip ARM cores, storage units, and hardware resources of the controllers through the AHB and the second bus. Dynamic balanced scheduling of processor resources mainly involves resource scheduling of the ARM cores of the BMC chip, and inter-core communication refers to communication between the ARM cores. By taking the Linux system preempting the core of the RTOS system as an example, the Linux system first sends an inter-core interrupt (interrupt number 9) to core 1 by an on-chip first bus on a certain core among cores 2-N. In response to the RTOS system being in an idle state at this time, preemption is allowed, the core 1 replies an inter-core interrupt (interrupt number 10) by the first bus, and releases peripheral controller resources (such as PWM/PECI) mapped by the current core 1. The Linux system receives the inter-core interrupt 10, initiates a preemption process, adds the core 1 to Linux SMP scheduling, and obtains the control right of the PWM/PECI peripherals at the same time, and can control same by the second bus.

In one aspect, the at least two operating systems include the first operating system and the second operating system, wherein the chip loads a communication value to the first bus, and the first bus sends a communication signal carrying the communication value to a communication register corresponding to the second operating system to implement communication between the first operating system and the second operating system, wherein the communication value is used for indicating communication content between the first operating system and the second operating system.

In another aspect, the chip loads a control value to the second bus, and the second bus sends a control signal carrying the control value to a register corresponding to a hardware controller, to control the hardware controller by the operating system, wherein the control value is configured to indicate control content of the hardware controller by the operating system.

It is mentioned above that the first bus is configured in a multi-master multi-slave mode, and can be a bus used for communication between a plurality of processor cores of the processor, such as the AHB; and the second bus is configured in a one-master multi-slave mode, and can be a bus used for control by the processor on the hardware controller, such as an Advanced Peripheral Bus (APB); and the bandwidth of the first bus is higher than the bandwidth of the second bus. This will be expanded for description below.

The AHB bus has been defined in AMBA2. The AHB bus is primarily used as a high-speed bus of the system at the beginning, is applicable to a high-performance and low-power-consumption system design, and is mainly used for connection between high-performance modules (such as a CPU, a DMA, and a DSP), and is used as an on-chip system bus of an SoC. In an AMBA protocol, the AHB is mainly oriented to a system-level high-bandwidth and high-performance system interconnection design, and includes the following characteristics: single clock edge operation; non-tristate implementation; supporting burst transmission; supporting segmented transmission; supporting a multi-master multi-slave interconnection mode; being capable of configuring a bus width of 32-128 bits; and supporting transmission of bytes, half-bytes, and words. An AHB system consists of 3 parts, i.e. a master module, a slave module, and an Infrastructure; transmission on the entire AHB bus is initiated by the master module, and the slave module is responsible for responding. The infrastructure comprises an arbiter, a multiplexer from the master module to the slave module, a multiplexer from the slave module to the master module, a decoder, a dummy slave module and a dummy master module.

The APB is mainly used for connection between low-bandwidth peripherals, such as UART, 1284, etc.; and a bus architecture thereof does not support multiple master modules as the AHB, and the only master module in the APB is the APB bridge. The features thereof comprise:

(1) being able to operate at a high frequency;

(2) simple protocol: no complex timing;

(3) synchronous bus: all transactions (read/write operations) on the bus depend on a rising edge of a clock;

(4) one-master multi-slave: in general, the APB is hung under an AHB bus system, and the transactions are converted between the AHB bus system via an AHB-APB Bridge, and at this moment, the Bridge is a master of the APB, and other peripheral devices are all slaves;

(5) simple interface: relative to AXI and AHB, the interface is simple;

(6) low power consumption;

(7) being capable of connecting various peripheral devices: I2C, SPI, Timer, Keypad, UART.

In some optional embodiments, in a multi-master multi-slave mode of the AHB, the Master first sends a packet sending request to the arbiter, the arbiter determines permission appropriate for the master to acquire a bus access, the master sends data and a control signal to the arbiter after acquiring the permission, and the arbiter determines a corresponding slave path by address resolution, and then sends the request to a corresponding destination end. Likewise, response data will be parsed by the Decoder and then returned to a corresponding master. Many-to-many access is achieved by such a multiplexing mechanism.

In some optional embodiments, in one-master multi-slave mode of the APB, the APB is usually hung under the AHB bus system, and the transactions are converted between the AHB bus system via an AHB-APB Bridge, and at this moment, the Bridge is a master of the APB, and other peripheral devices are all slaves. A data request can only be sent by the Master to a slave, and the slave returns corresponding response data to the master after the request is received. This process can achieve one-to-many access, and the access does not involve arbitration and Decoder parsing operations in the AHB bus.

In addition, the AHB bus also has a high bandwidth characteristic and is used for interconnection between high-performance modules (CPU, DMA, etc.) in the system; and the APB bus has a low bandwidth and is used for connection between peripherals (UART, I2C, etc.) in the system. A logical circuit and a bus protocol of the AHB bus are complex, and an interface circuit and a bus protocol of the APB bus are relatively simple.

The operating system controls the hardware controller by accessing (for example, executing a read operation and a write operation) a register of each hardware controller; a manner for the operating system accessing the register of the hardware controller may be, but is not limited to, reading or writing a register address of each hardware controller, and addresses of these registers may be but are not limited to, unique and determined during chip design. For example, the operating system writes a value (i.e. the communication value or control value above) into a address (i.e. the communication register or the register corresponding to the hardware controller), to implement a function (for example, a communication function between the operating systems or a control function of the operating system for the hardware controller). That is to say, different functions correspond to different control values, and a correlation between functions of the hardware controller and control values is maintained in the chip, for example, a control value 00 represents acceleration of an air conditioner by one gear, and a control value 01 represents deceleration of the air conditioner by one gear, and so on.

Interaction such as communication and control, etc. between the operating systems and between the operating systems and the hardware controller may be, but is not limited to, through a bus. The read/write operation performed by the operating system on the register of each hardware controller is finally converted into a control signal for the hardware controller by the first bus (or the second bus); and this part of conversion work and the control process on the hardware controller by the first bus (or the second bus) may be, but is not limited to, automatically implemented by hardware inside the chip. The implementation process follows bus specifications. In an operation process of the first bus (or the second bus), on the one hand, a physical signal related to a bus protocol can be transmitted, and on the other hand, valid data can also be transmitted to each hardware controller through a physical data channel thereof.

By the embedded system above, the first operating system and the second operating system run based on the processor, and implement communication between the operating systems and control of the hardware controller via buses with different functions. Since both the first operating system and the second operating system operate based on the same processor, the increase and deployment of hardware devices are avoided, the system cost is reduced, and processor resources are rationally utilized to support operation between the systems; therefore, the technical problem of low operation efficiency of the operating systems can be solved, and the technical effect of improving the operation efficiency of the operating systems is achieved.

Embodiments of the present disclosure further provide a main board, wherein the main board includes: at least one processor; at least one memory, for storing at least one program; when the at least one program is executed by the at least one processor, the at least one processor implements the steps in any one of the method embodiments above.

Embodiments of the present disclosure also provide a server, including a processor, a communication interface, a memory and a communication bus, wherein the processor, the communication interface and the memory complete communication with each other through the communication bus, and the memory is used for storing a computer program; the processor is configured to implement the steps in any one of the method embodiments above when executing the program stored in the memory, so as to achieve the same technical effect.

The communication bus of the server may be a Peripheral Component Interconnect (PCI) bus, or an Extended Industry Standard Architecture (EISA) bus, or the like. The communication bus may be classified into an address bus, a data bus, a control bus, and the like. The communication interface is used for communication between the server and other devices.

The memory may comprise an Random Access Memory (RAM), and can also include an Non-Volatile Memory (NVM), for example, at least one magnetic disk memory. Optionally, the memory can also be at least one storage apparatus located far away from the processor. The processor may be a general-purpose processor, comprising a CPU, an Network Processor (NP), and the like; and may also be a Digital Signal Processing (DSP), an Application Specific Integrated Circuit (ASIC), an Field-Programmable Gate Array (FPGA) or other programmable logic devices, discrete gate or transistor logic devices, and discrete hardware assemblies.

It should be noted that for a server, the server at least has characteristics of high extensibility and high stability, wherein an enterprise network may not be permanent, and in today's network informatization, in response to the server does not have a certain extensibility, then the subsequent development of the enterprise may be affected; therefore, extensibility becomes one of the most basic characteristics of the server. Besides extensibility of hardware, extensibility also comprises extensibility on software. Because functions of the server are very complicated compared with a computer, both hardware configuration and software configuration are important. It is also unimaginable to achieve more functions without full software support.

In addition, as the server needs to process a large amount of data to support continuous running of a service, the server also has a very important feature, i.e. high stability. In response to data transmission of the server cannot stably run, it will inevitably cause great effect on the service development.

In the solutions of some embodiments of the present disclosure, by utilizing the characteristic of high extensibility of the server, the first system and the second system, i.e. dual software systems are introduced to generate a hardware interface signal; and hardware devices, such as GPLD and BMC chip, are also introduced to respectively adjust a transmission voltage of the hardware interface signal and monitor the running states of other devices inside the server. On this basis, in some embodiments of the present disclosure, a manner of a first system generating a hardware interface signal corresponding to a request command is used, in which first the request command is acquired by the first system, then multiple pieces of logical bit information corresponding to the request command are determined, and finally, a hardware interface signal corresponding to the request command is generated based on the multiple pieces of logical bit information and a timer. It can be determined from the content above that in some embodiments of the present disclosure, a hardware interface signal corresponding to a request command is generated by the first system, so that the technical effect of simulating by using a software manner to generate a hardware interface signal is achieved, thereby achieving the object that a chip itself does not need to have a hardware logic design of a relevant hardware interface signal, which not only reduces the design difficulty of the chip, but also reduces the design cost of the chip. Some embodiments of the present disclosure achieve the purpose of using a software system to generate a hardware interface signal on the basis that a chip does not need to have a hardware logic design of a hardware interface signal, thereby reducing the design difficulty of the chip, and further solving the technical problem in the related art that the design cost of the chip is relatively high due to the fact that the chip itself needs to have a hardware logic design of a controller.

In addition, the introduction of a dual software system, i.e. the first system and the second system can also ensure the stability of a server. Since the service response speed of the second system is less than the service response speed of the first system, the first system with a higher service response speed is used to generate the hardware interface signal, so that it can be ensure that the generation of the hardware interface signal is not interrupted, thereby ensuring that the hardware interface signal can be continuously and stably outputted.

A person of ordinary skill in the art could appreciate that all or some of the steps in various methods of the embodiments above can be completed by a program instructing relevant hardware of a terminal device, the program can be stored in a computer-readable storage medium, and the storage medium can include: a flash disk, a read only memory (ROM), a random access memory (RAM), a magnetic disk or an optical disk etc.

The sequence number of the embodiments above of the present disclosure are only for description, but do not denote the preference of the embodiments.

In the described embodiments of the present disclosure, the description of each embodiment has its own emphasis. For the part not detailed in a certain embodiment, please refer to the relevant description in other embodiments.

In the several embodiments provided in the present disclosure, it should be understood that the disclosed technical content may be implemented in other manners. The apparatus embodiments described above are illustrative. For example, the division of a unit or a module is only a logical function division, and in actual implementation, there may be another division manner, for example, multiple units or assemblies may be combined, or can be integrated into another system, or some features can be ignored or not executed. In addition, the mutual coupling or direct coupling or communication connection shown or discussed may be indirect coupling or communication connection through some interfaces, units or modules, and may be in the form of electricity or other forms.

The units described as separate components may or may not be physically separated, and components displayed as units may or may not be physical units, that is, may be located in one place, or may be distributed to multiple network units. Some or all units can be selected according to actual needs to achieve the purpose of the solutions of the embodiments.

In addition, functional units in the embodiments of the present disclosure may be integrated in one processing unit, or the units may exist alone physically, or two or more units are integrated into one unit. The integrated unit may be implemented in the form of hardware, and may also be implemented in the form of a software functional unit.

If the integrated unit is implemented in the form of a software functional unit and is sold or used as an independent product, the integrated unit can be stored in a computer-readable storage medium. On the basis of such understanding, the part of the technical solutions of some embodiments of the present disclosure that contributes in essence or to the related art or all or part of the technical solutions may be embodied in the form of a software product. The computer software product is stored in a storage medium and comprises several instructions to enable a computer device (which may be a personal computer, a server or a network device, etc.) to execute all or some of the steps of the method described in various embodiments of the present disclosure. The storage medium above comprises: media such as a USB flash disk, a Read-Only Memory (ROM), a Random Access Memory (RAM), a removable hard disk, a magnetic disk, or an optical disk, and the like which can store program codes.

What is claimed is:

1. A method for generating a hardware interface signal, comprising:

acquiring, by a first system, a request command;

determining multiple pieces of logical bit information corresponding to the request command; and generating the hardware interface signal corresponding to the request command based on the multiple pieces of logical bit information and a timer;

wherein generating the hardware interface signal corresponding to the request command based on the multiple pieces of logical bit information and the timer comprises:

determining a reload value and an initial matching value which correspond to the timer based on the multiple pieces of logical bit information; and generating the hardware interface signal corresponding to the request command based on the reload value and the initial matching value;

wherein determining the reload value and the initial matching value which correspond to the timer based on the multiple pieces of logical bit information comprises:

acquiring a runtime corresponding to each piece of logical bit information of the multiple pieces of logical bit information;

determining the reload value based on the runtime; and determining one initial matching value corresponding to the timer based on a logical bit of the each piece of logical bit information, to obtain multiple initial matching values corresponding to the timer, wherein the initial matching value corresponding to the each piece of logical bit information is configured to control a duration when the logical bit information is at a high level, to control a logical bit of the logical bit information to be 0 or 1.

2. The method as claimed in claim 1, wherein generating the hardware interface signal corresponding to the request command based on the reload value and the initial matching value, comprises:

based on a sequence of the multiple pieces of logical bit information corresponding to the request command, the reload value and the initial matching value which corresponds to the each piece of logical bit information, sequentially generating a hardware interface sub-signal corresponding to the each piece of logical bit information, to obtain the hardware interface signal.

3. The method as claimed in claim 2, wherein sequentially generating the hardware interface sub-signal corresponding to the each piece of logical bit information based on the reload value and the initial matching value which corresponds to the each piece of logical bit information, comprises:

performing a decrement operation on the reload value corresponding to the each piece of logical bit information based on the timer;

before the reload value corresponding to the each piece of logical bit information is decremented to the initial matching value corresponding to the logical bit information, outputting, by the first system, a first signal corresponding to the logical bit information, wherein the first signal is a high-level signal;

after the reload value corresponding to the each piece of logical bit information is decremented to the initial matching value corresponding to the logical bit information, outputting, by the first system, a second signal corresponding to the logical bit information, wherein the second signal is a low-level signal;

in response to the reload value corresponding to the each piece of logical bit information being decremented to 0, determining to generate the hardware interface sub-signal corresponding to the logical bit information, to obtain the hardware interface sub-signal corresponding to the each piece of logical bit information, wherein the hardware interface sub-signal corresponding to the each piece of logical bit information is formed by the first signal and the second signal which correspond to the logical bit information.

4. The method as claimed in claim 3, wherein the method further comprises:

in response to the reload value corresponding to the each piece of logical bit information being decremented to the initial matching value corresponding to the logical bit information, triggering a first interrupt corresponding to the logical bit information;

in response to the reload value corresponding to the each piece of logical bit information being decremented to 0, triggering a second interrupt corresponding to the logical bit information.

5. The method as claimed in claim 4, wherein in a process of sequentially generating the hardware interface sub-signal corresponding to the each piece of logical bit information based on the reload value and the initial matching value which corresponds to the each piece of logical bit information, the method further comprises:

performing interrupt count once every time one first interrupt or second interrupt is triggered;

determining a field which is currently performing signal conversion processing in the request command based on the interrupt count, wherein the signal conversion processing is configured to generate the hardware interface sub-signal corresponding to logical bit information which corresponds to each field in the request command.

6. The method as claimed in claim 5, wherein determining the field which is currently performing signal conversion processing in the request command according to the interrupt count, comprises:

acquiring the number of bytes corresponding to each field in the request command;

determining the number of pieces of logical bit information corresponding to the request command based on the number of bytes, wherein each byte corresponding to the request command corresponds to one piece of logical bit information;

determining the number of interrupts corresponding to the request command based on the number of pieces of logical bit information, wherein the number of interrupts corresponding to the request command is twice the number of pieces of logical bit information;

determining the field which is currently performing signal conversion processing in the request command based on the number of interrupts and the interrupt count.

7. The method as claimed in claim 6, wherein determining the field which is currently performing signal conversion processing in the request command based on the number of interrupts and the interrupt count, comprises:

determining logical bit information which is currently converted into the hardware interface sub-signal based on the number of interrupts and the interrupt count;

determining a byte corresponding to the logical bit information which is currently converted into the hardware interface sub-signal as a target byte;

determining that a field corresponding to the target byte is the field which is currently performing signal conversion processing in the request command.

8. The method as claimed in claim 1, wherein a data structure of request data corresponding to the request command is a first data structure, wherein the first data structure at least comprises a device address, a write length, a read length, a command code and a request parameter; the device address is configured to characterize an address of a target device, the target device is a device generating response data based on the hardware interface signal, the command code is configured to distinguish different request commands, the write length is configured to characterize the number of bytes from the start of the command code to the end of the request data, the read length is configured to characterize the number of bytes containing a completion code and read data in the request data, and the request parameter is configured to characterize a parameter of the request command.

9. The method as claimed in claim 8, wherein acquiring, by the first system, the request command, comprises:

in response to the first system detects a first request triggered by the second system, acquiring the request data wherein the first system and the second system run on the same processor, the request data is generated by the second system, and a service response speed of the second system is less than a service response speed of the first system;

parsing the request data, to obtain the request command.

10. The method as claimed in claim 9, wherein before the request data is acquired, the method further comprises:

storing, by the second system, the request data in a target memory, and after the request data is stored, triggering, by the second system, the first request, wherein the first request is configured to notify the first system of reading the request data from the target memory, and the target memory is a memory that can be accessed by both the first system and the second system.

11. The method as claimed in claim 1, wherein after the hardware interface signal corresponding to the request command is generated based on the multiple pieces of logical bit information and the timer, the method further comprises:

converting a voltage of the hardware interface signal, to obtain a target hardware interface signal.

12. The method as claimed in claim 11, wherein converting the voltage of the hardware interface signal, to obtain the target hardware interface signal, comprises:

inputting the hardware interface signal into a voltage conversion device, to obtain the target hardware interface signal outputted by the voltage conversion device.

13. The method as claimed in claim 1, wherein the method further comprises:

receiving, by the first system, response data corresponding to the hardware interface signal, wherein a transmission form of the response data is the same as a transmission form of the hardware interface signal;

adjusting the data structure of the response data to a second data structure.

14. The method as claimed in claim 13, wherein the second data structure at least comprises: a first check value, a second check value and response validity data, wherein the first check value is configured to characterize a check value in the request data, the second check value is configured to characterize a check value in the response data, the response validity data is configured to characterize a completion code in the response data and data for describing a state of the target device, and the target device is a device generating the response data according to the hardware interface signal.

15. An embedded system, comprising:

a first system and a processor, wherein the first system runs on the processor;

the first system; being configured to acquire a request command, determine multiple pieces of logical bit information corresponding to the request command; and generate a hardware interface signal corresponding to the request command based on the multiple pieces of logical bit information and a timer:

wherein the first system is further configured to determine a reload value and an initial matching value which correspond to the timer based on the multiple pieces of logical bit information;

the first system is further configured to generate a hardware interface signal corresponding to the request command based on the reload value and the initial matching value;

the first system is further configured to acquire a runtime corresponding to each piece of logical bit information of the multiple pieces of logical bit information;

the first system is further configured to determine the reload value according to the runtime; and the first system is further configured to determine one initial matching value corresponding to the timer according to a logical bit of each piece of logical bit information, to obtain multiple initial matching values corresponding to the timer, wherein the initial matching value corresponding to each piece of logical bit information is configured to control a duration when the logical bit information is at a high level, to control a logical bit of the logical bit information to be 0 or 1.

16. The embedded system as claimed in claim 15, wherein a data structure of request data corresponding to the request command is a first data structure, wherein the first data structure at least comprises a device address, a write length, a read length, a command code and a request parameter; the device address is configured to characterize an address of a target device, the target device is a device generating response data based on the hardware interface signal, the command code is configured to distinguish different request commands, the write length is configured to characterize the number of bytes from the start of the command code to the end of the request data, the read length is configured to characterize the number of bytes containing a completion code and read data in the request data, and the request parameter is configured to characterize a parameter of the request command.

17. The embedded system as claimed in claim 16, wherein the embedded system further comprises a second system, wherein both the second system and the first system run on the processor, the second system, configured to generate the request data;

the first system, configured to acquire the request data, in response to detect a first request triggered by the second system, wherein a service response speed of the second system is less than a service response speed of the first system;

the first system, configured to parse the request data, to obtain the request command.

18. An electronic device, comprising a memory, a processor, and a computer program stored on the memory and capable of running on the processor, wherein when the computer program is executed by the processor, cause the processor to:

acquire, by a first system, a request command;

determine multiple pieces of logical bit information corresponding to the request command;

generate the hardware interface signal corresponding to the request command based on the multiple pieces of logical bit information and a timer;

wherein generating the hardware interface signal corresponding to the request command based on the multiple pieces of logical bit information and the timer comprises:

determining a reload value and an initial matching value which correspond to the timer based on the multiple pieces of logical bit information; and generating the hardware interface signal corresponding to the request command based on the reload value and the initial matching value;

wherein determining the reload value and the initial matching value which correspond to the timer based on the multiple pieces of logical bit information comprises:

acquiring a runtime corresponding to each piece of logical bit information of the multiple pieces of logical bit information;

determining the reload value based on the runtime; and determining one initial matching value corresponding to the timer based on a logical bit of the each piece of logical bit information, to obtain multiple initial matching values corresponding to the timer, wherein the initial matching value corresponding to the each piece of logical bit information is configured to control a duration when the logical bit information is at a high level, to control a logical bit of the logical bit information to be 0 or 1.

* * * * *